US007650468B2

(12) United States Patent
Hirano

(10) Patent No.: US 7,650,468 B2
(45) Date of Patent: Jan. 19, 2010

(54) DEVICE FOR PROCESSING ACCESS CONCURRENCE TO SHARED MEMORY

(75) Inventor: Tetsuya Hirano, Hamamatsu (JP)

(73) Assignee: Kabushiki Kaisha Kawai Gakki Seisakusho, Hamamatsu-shi (JP)

( * ) Notice: Subject to any disclaimer, the term of this patent is extended or adjusted under 35 U.S.C. 154(b) by 100 days.

(21) Appl. No.: 10/583,868

(22) PCT Filed: Nov. 29, 2004

(86) PCT No.: PCT/JP2004/017684

§ 371 (c)(1),
(2), (4) Date: Jun. 21, 2006

(87) PCT Pub. No.: WO2005/062183

PCT Pub. Date: Jul. 7, 2005

(65) Prior Publication Data

US 2007/0113024 A1    May 17, 2007

(30) Foreign Application Priority Data

Dec. 22, 2003  (JP)  .............................. 2003-423963
Dec. 22, 2003  (JP)  .............................. 2003-423964

(51) Int. Cl.
G06F 12/00   (2006.01)
G06F 13/00   (2006.01)
G06F 13/28   (2006.01)

(52) U.S. Cl. ........................... 711/150; 712/35; 712/36; 84/602

(58) Field of Classification Search ................. 711/150; 712/35, 36; 84/602
See application file for complete search history.

(56) References Cited

U.S. PATENT DOCUMENTS 4,144,522 A     3/1979   Kageyama et al.
4,991,169 A  *  2/1991   Davis et al. ................. 370/463
5,111,530 A  *  5/1992   Kutaragi et al. ............. 704/270

(Continued)

FOREIGN PATENT DOCUMENTS

JP     2-135564    5/1990

(Continued)

OTHER PUBLICATIONS

Austin, B.; "A Dynamic Disc Allocation Algorithm Designed to Reduce Fragmentation During File Reloading"; Information Sciences Laboratory, Corporate Research and Development Center, General Electric Company, 1970 (4 pages).

(Continued)

Primary Examiner—Stephen C Elmore
Assistant Examiner—Mark A Giardino, Jr.
(74) Attorney, Agent, or Firm—Oblon, Spivak, McClelland, Maier & Neustadt, L.L.P.

(57) ABSTRACT

A data processor that allows a CPU to access an external memory in an interval between data accesses from a DSP having a variable data length. In a case where a 24-bit mode is set, when a determination section determines that the DSP is accessing the external memory, a control section commands to place an access from the CPU to the external memory in a wait state. In a case where a 16-bit mode is set, the control section commands an address-data switching section, allowing the CPU to access the external memory by utilizing a third bus cycle, which is free.

4 Claims, 17 Drawing Sheets

U.S. PATENT DOCUMENTS

| | | |
|---|---|---|
| 5,155,847 A | 10/1992 | Kirouac et al. |
| 5,371,885 A | 12/1994 | Letwin |
| 5,819,292 A | 10/1998 | Hitz et al. |
| 6,209,111 B1 | 3/2001 | Kadyk et al. |
| 6,745,284 B1 | 6/2004 | Lee et al. |
| 6,745,305 B2 | 6/2004 | McDowell |
| 7,007,196 B2 | 2/2006 | Lee et al. |
| 7,032,154 B2 | 4/2006 | Kidorf et al. |
| 7,043,677 B1 | 5/2006 | Li |
| 2002/0004883 A1 | 1/2002 | Nguyen et al. |
| 2002/0055942 A1 | 5/2002 | Reynolds |
| 2002/0087788 A1 | 7/2002 | Morris |
| 2002/0161972 A1 | 10/2002 | Talagala et al. |
| 2003/0033477 A1 | 2/2003 | Johnson et al. |
| 2003/0126107 A1 | 7/2003 | Yamagami |
| 2003/0145167 A1 | 7/2003 | Tomita |
| 2004/0098720 A1 | 5/2004 | Hooper |
| 2004/0107314 A1 | 6/2004 | Kim et al. |
| 2004/0123063 A1 | 6/2004 | Dalal et al. |
| 2004/0225834 A1 | 11/2004 | Lu et al. |
| 2004/0234000 A1 | 11/2004 | Page |
| 2005/0097270 A1 | 5/2005 | Kleiman et al. |
| 2005/0235154 A1 | 10/2005 | Serret-Avila |
| 2006/0218644 A1 | 9/2006 | Niles et al. |

FOREIGN PATENT DOCUMENTS

| | | |
|---|---|---|
| JP | 5-73046 | 3/1993 |
| JP | 2850707 | 11/1998 |
| JP | 11-167517 | 6/1999 |
| JP | 2001-5789 | 1/2001 |
| JP | 2001-166983 | 6/2001 |
| JP | 2003-281083 | 10/2003 |

OTHER PUBLICATIONS

Goodheart, B. et al.; "The Magic Garden Explained"; Prentice Hall, 1994 (8 pages).

Stallings, W.; "Computer Organization and Architecture: Designing for Performance"; Prentice Hall, 2000 (4 pages).

* cited by examiner

| | | CpTmE24Acs |
|---|---|---|
| 24bit _MODE (1) | R | 1 |
| | W | 1 |
| | N | 0 |
| 16bit _MODE (0) | R | 0 |
| | W | 0 |
| | N | 0 |

CpTmE24Acs = 0
When CPU 111 is allowed to access

Fig.13

| DSP2a | DSP2b | After control |
|-------|-------|---------------|
| R1 | R2 | N |
| R1 | W2 | N |
| R1 | N  | R1 |
| W1 | R2 | N |
| W1 | W2 | N |
| W1 | N  | W1 |
| N  | R2 | R2 |
| N  | W2 | W2 |
| N  | N  | N |

R: read
W: write
N: no access

Fig.14

| R1 | W1 | EAcID | |
|----|----|-------|---|
| 0 | 0 | 1 | DSP2b |
| 1 | 0 | 0 | DSP2a |
| 0 | 1 | 0 | DSP2a |

DEVICE FOR PROCESSING ACCESS CONCURRENCE TO SHARED MEMORY

TECHNICAL FIELD

The present invention relates to a data processor, only through which a CPU is allowed to access an external memory to be used by the data processor, and a data processor comprising a plurality of data processing architectures in a single package, which allows access to an external memory.

BACKGROUND ART

The recent trend is toward an increase in the amount of signal processing using a DSP, which can digitally process a sound, a musical instrument sound and an audio signal. In order to cope with this trend, DSPs having a high signal processing capacity are utilized, or a plurality of DSPs are utilized.

In order to apply an effect to a musical tone output from a sound source, such as an electronic musical instrument, a DSP for performing signal processing for effect application includes an external memory, which is used for the purpose of delay processing or the like.

It is common that such a DSP $2c$ is used, having an external memory 102 connected thereto for storing a digital delay data as shown in FIG. 20. This figure shows that one sampling cycle (44.1 KHz) contains sixty-four timings when the access to the external memory 102 is available.

DISCLOSURE OF THE INVENTION

Problems that the Invention is to Solve

Although it is normal that a CPU included in an electronic musical instrument uses a RAM connected to a system bus, such a CPU has a function of accessing, through a DSP, an external memory for the DSP in some cases. There has been proposed a method wherein in a case where the access from a CPU and the access from a DSP are concurrently caused in such a system, the access from the DSP takes precedence and the access from the CPU is placed in a wait state at a timing when the DSP accesses an external memory. The reason is that it is programmed that the operation of the DSP is performed at a fixed operation timing (see Patent Document 1 described later). It is possible to provide the DSP with a timing of access to the external memory without waste, by delaying the access from the CPU.

Patent Document 1: Japanese Patent No. 2850707

There is proposed another method for performing the access from a CPU and the access from a DSP in a time-division manner. Although the number of the access from the DSP slightly decreases in this method in comparison with the former method, the number of the access from the CPU increases.

Now, the relationship between the unit of a word dealt with by a DSP and a bus cycle will be described. Most of DSPs use an 8-bit data bus to access an external memory for delay processing because of the bus structure and the CPU in the system.

One word as the unit of data processing in a DSP is a 16-bit word or a 24-bit word, and each word is composed of one of these bit units. Some systems are operated so that a 16-bit word (16-bit mode) is normally used, and that when processing is performed with high precision, the mode is switched to a 24-bit word (24-bit mode).

In such a structure, three access cycles (bus cycles) form one group. In the case of a 16-bit mode, two of the three access cycles are utilized. In the case of a 24-bit mode, the three access cycles are utilized.

On the other hand, the access may be repeated, setting the data bus width of the memory as the data length, since the data length to be accessed by the CPU is not bound by the data length of the DSP. In this case, the access may be performed with one word being composed of 8 bits (1 byte).

Under the above-mentioned premises, trouble is caused in the conventional structures when the data length to be accessed by a DSP is variable.

For example, when adopting the method for placing the access from the CPU in a wait state, this method is suited to the 24-bit mode, although this method causes a waste in the precious bus cycles in the 16-bit mode since one bus cycle in one data access unit (comprising three bus cycles) is not used at the all time.

When adopting the method for performing the access from a CPU and the access from a DSP in a time-division manner, this method is suited to the 16-bit mode, although there is no fixed timing for the CPU in the 24-bit mode.

Further, the following problem has been caused as a problem of a data processor per se, irrespective of, e.g., the concurrent access with a CPU.

Specifically, in, e.g., a case where the amount of delay in an external memory is smaller than the memory size, independent connection with the external memory is wasteful in terms of capacity and cost. On the other hand, when a plurality of DSPs are used, a plurality of external memories are normally required, which causes a problem in terms of circuit design that the number of discrete parts increases.

The present invention is proposed in consideration of the problems described above. It is an object of the present invention to provide a data processor, which allows a CPU to access an external memory in an interval between data accesses from a DSP having a variable data length.

It is another object of the present invention to solve the above-mentioned second problem by providing a data processor, which comprises a plurality of DSPs formed in one package, the DSPs being capable of sharing a single external memory.

It is still another object of the present invention to provide a structure, which is capable of using such a data processor to apply an effect to the waveform data of a musical tone stored particularly in a single external memory.

Exemplary Embodiments for Solving the Problem

In a first exemplary embodiment of the present invention, a data processor is provided, the data processor comprising:
a CPU configured to control an entire system;
a DSP configured to perform preset processing, to have at least two bus cycles in a unit of one data access, and to use a selectable number of the bus cycles in the unit of one data access; and
an external memory configured to be accessed by the DSP and to be accessed through the DSP by the CPU, wherein
a data word length accessed by the DSP at the external memory is variable, and
the DSP includes
a determination unit configured to determine whether the DSP is accessing the external memory;
a control unit configured to determine whether the CPU is allowed to access the external memory, based on a signal from the determination unit; and a switching unit configured to perform a switching operation of an address and a data in connection with the external memory according to a command from the control unit, and to input and to output the address and the data based on the switching operation, wherein when the DSP accesses the external memory using a maximum number of the bus cycles in a unit of data access wherein the DSP actually accesses the external memory, access from the CPU to the external memory is placed in a wait state until a subsequent unit of data access commences, and when the DSP does not access the external memory using the maximum number of the bus cycles in said unit of data access wherein the DSP actually accesses the external memory, access from the CPU to the external memory is constantly allowed during said unit of data access.

In accordance with the above-mentioned structure, in a case where the data word length is selected so as to perform accessing by a maximum number (e.g., such as three bus cycles) of the bus cycles (e.g., one word=24-bit mode), when the determination unit determines that the DSP is accessing the external memory, the access from the CPU to the external memory is placed in a wait state by the control unit, and in a case where the data word length is not selected so as to perform accessing by a maximum number of the bus cycles (e.g., one word=16-bit mode), the control unit allows the CPU to access the external memory by utilizing a free bus cycle. Accordingly, when there is a free bus cycle, the bus cycles are fixed (in other words, a free bus cycle in, e.g., a 16-bit mode is fixed for access from the CPU so that the CPU is allowed to access the external memory at the free bus cycle), and, when there is no free bus cycle, the operation is switched to a method wherein access from the DSP takes precedence (in other words, when there is no free bus cycle as in, e.g., the 24-bit mode, the bus cycles are basically used for access from the DSP, and only when there is no access from the DSP, the CPU is allowed to access the external memory).

In a second exemplary embodiment of the present invention, a data processor is provided, the data processor comprising:

a CPU configured to control an entire system;

a sound source configured to supply a musical tone signal;

a DSP configured to perform preset processing to apply a desired effect to the musical tone signal supplied from the sound source, to have at least two bus cycles in a unit of one data access with respect to signal processing of the musical tone signal, and to use a selectable number of bus cycles in the unit of one data access; and an external memory configured to be accessed by the DSP and to be accessed through the DSP by the CPU, wherein a data word length accessed by the DSP at the external memory is variable, and the DSP includes a determination unit configured to determine whether the DSP is accessing the external memory;

a control unit configured to determine whether the CPU is allowed to access the external memory, based on a signal from the determination unit; and a switching unit configured to perform a switching operation of an address and a data in connection with the external memory according to a command from the control unit, and to input and to output the address and the data based on the switching operation, wherein when the DSP accesses the external memory using a maximum number of the bus cycles in a unit of data access wherein the DSP actually accesses the external memory, access from the CPU to the external memory is placed in a wait state until a subsequent unit of data access commences, and when the DSP does not access the external memory using the maximum number of the bus cycles in said unit of data access wherein the DSP actually accesses the external memory, access from the CPU to the external memory is constantly allowed during said unit of data access.

Further, a third exemplary embodiment of the present invention includes a data processor having a fixed number of memory access timings per sampling cycle. The data processor comprises:

a plurality of DSPs configured to access a single external memory in a single package;

a read/write control unit configured so that when each of the DSPs issues a read command or a write command at a same time, none of the commands from the DSPs are performed and when only one of the DSPs issues the read command or the write command, the command from the only one DSP is performed;

an access determination unit configured so that when each of the DSPs issues the read command or the write command at the same time, none of the DSPs are not allowed to access the external memory and when the only one of the DSPs issues the read command or the write command, the only one DSP is allowed to access the external memory;

a first selector configured to output an address from the allowed DSP in response to a determination signal from the access determination unit; and a second selector configured to output data from the allowed DSP in response to the determination signal, wherein each of the DSPs includes a control unit configured to acquire data from the external memory in response to the determination signal from the access determination unit, and the read/write control unit does not access the external memory when each of the DSPs simultaneously issues a command.

In accordance with the structure of the third exemplary embodiment, when each of the DSPs issues a read command or a write command at the same timing, the read/write control unit controls the command of which DSP is allowed, and when each of the DSPs issues a read command or a write command at the same timing, the access determination unit determines which DSP is allowed to perform memory access. The first selector outputs an address from the allowed DSP in response to a determination signal from the access determination unit, and the second selector outputs a data from the allowed DSP in response to the determination signal. On the other hand, a DSP, which is allowed to perform memory access to read out a data by the access determination unit, acquires, from the control unit for data acquisition, such a data output from the external memory in response to the determination signal from the access determination unit, the control unit for data acquisition being included in the allowed DSP. These units are combined, providing the data processor wherein the plural DSPs are formed in one package, and the DSPs can share the single external memory.

In a fourth exemplary embodiment of the present invention, a data processor having a fixed number of memory access timings per sampling cycle is provided, the data processor comprising:

a plurality of DSPs configured to access a single external memory in a single package, the external memory storing musical tone waveform data;

a read/write control unit configured so that when each of the DSPs issues a read command or a write command at a same time, none of the commands from the DSPs are performed and when only one of the DSPs issues the read command or the write command, the command from the only one DSPs is performed;

an access determination unit configured so that when each of the DSPs issues the read command or the write command at the same time, none of the DSPs are not allowed to access the external memory and when only one of the DSPs issues the read command or the write command, the only one DSP is allowed to access the external memory;

a first selector configured to output an address from the allowed DSP in response to a determination signal from the access determination unit; and a second selector configured to output data from the allowed DSP in response to the determination signal, wherein each of the DSPs includes a control unit configured to acquire data from the external memory in response to the determination signal from the access determination unit and the read/write control unit does not access the external memory when each of the DSPs simultaneously issues a command.

When musical tone waveform data are output form plural channels, two or more DSPs, which apply an effect to a musical tone waveform data, are used, depending on the number of the effects to be applied (including a case where different kinds of effects are applied), in some cases. It is considered to be reasonable in terms of a reduction in power consumption and improvement in processing speed that the provision of plural DSPs, which is caused by an increase in signal processing using DSPs, is realized as one package to form a system LSI. In the fourth exemplary embodiment, a data processor, wherein plural DSPs are put into one package, and these DSPs can share a single external memory, is proposed to be used as a structure for applying an effect to a musical tone waveform data.

With respect to the structures defined in the third and fourth exemplary embodiments, it is preferred that the read/write control unit be controlled so as not to access the external memory when the respective DSPs issue plural commands.

Effect Exemplary Embodiments of the Invention

In accordance with the data processors defined in the first and second exemplary embodiments of the present invention, the CPU is allowed to access the external memory in an interval between data accesses from the DSP having a variable data length in access. Accordingly, it is possible to have a beneficial effect of allowing the CPU to be operated so as to maximize the number of access without disturbing the access from the DSP.

In accordance with the data processors defined in the third and fourth exemplary embodiments of the present invention, it is possible to have beneficial effects of eliminating waste in the capacity of the external memory by providing an LSI wherein the plural DSPs are formed in one package with the DSPs being capable of sharing a single external memory, and of making it simpler to design a circuit using the plural DSPs to perform signal processing.

In particular, when two or more of DSPs are required to apply two kinds or more of effects to the waveform data of a musical tone as defined in the fourth exemplary embodiment, it is possible to have advantages of eliminating waste in the capacity of the external memory and of shortening the fabrication process since the peripheral parts of a circuit using the above-mentioned structure, such as an electronic musical instrument, are prevented from being complicated.

BRIEF DESCRIPTION OF DRAWINGS

FIG. 13 is a schematic view showing how a read/write control section 22 exercises control when a DSP 2a and a DSP 2b issue a read command or a write command;

FIG. 14 is a schematic view showing how an access determination section 23 exercises control when the DSP 2a issues a read command or a write command;

Figure 1:
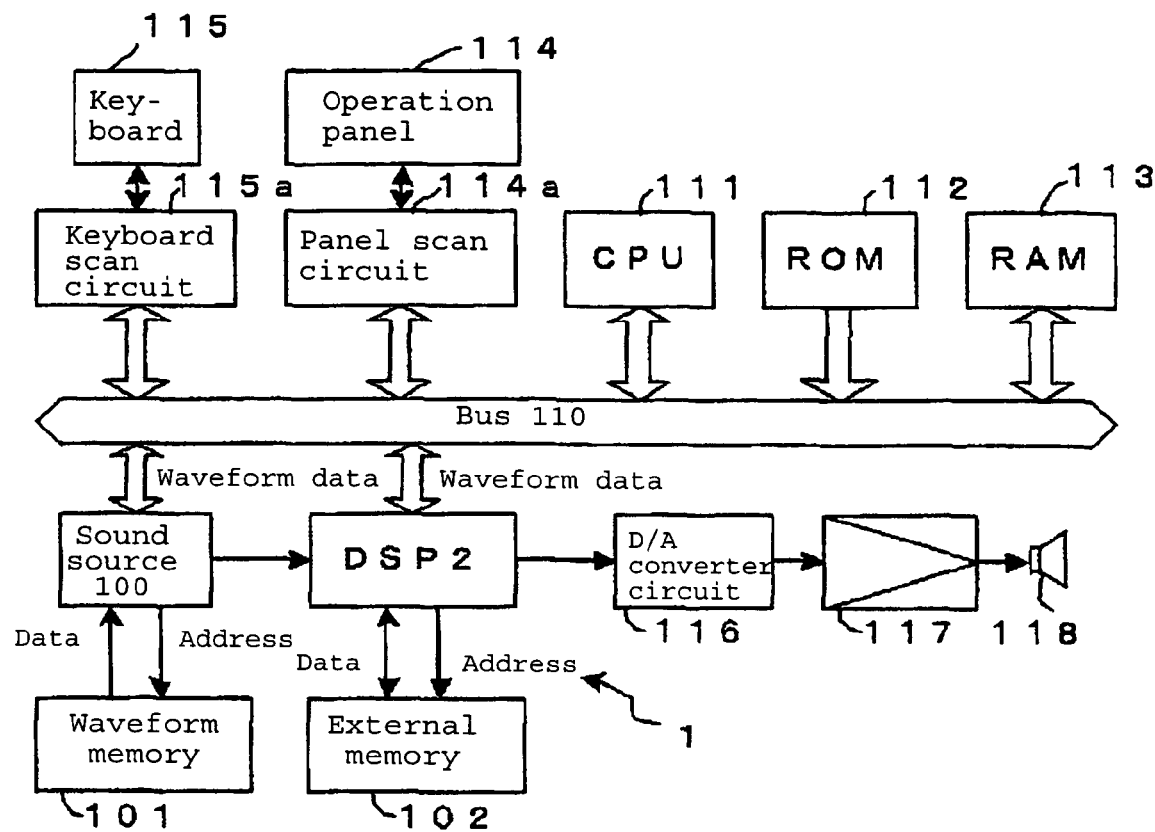
FIG. 1 is a schematic circuit diagram of an electronic keyboard musical instrument using the structure of the data processor according to Embodiment 1 of the present invention.

| Explanation of Reference Numerals | |
|---|---|
| 1 | data processor |
| 2, 2, 2, 2a, 2b, 2c | DSP |
| 3 | memory access control section |
| 11 | determination section |
| 12 | control section |
| 13 | data-switching section |
| 14 | DSP operation section |
| 15 | command RAM |
| 16 | decoder |
| 21 | LSI for effect processing |
| 22 | read/write control section |
| 23 | access determination section |
| 24 | address output selector |
| 25 | data output selector |
| 26 | control section for data acquisition |
| 27 | data register |
| 100 | sound source |
| 101 | waveform memory |
| 102 | external memory |
| 110 | system bus |
| 110 | bus |
| 111 | CPU |
| 112 | ROM |
| 113 | RAM |
| 114 | operation panel |
| 114a | panel scan circuit |
| 115 | keyboard |
| 115a | keyboard scan circuit |
| 116 | D/A converter circuit |
| 117 | amplifier |
| 118 | speaker |

BEST MODE FOR CARRYING OUT THE INVENTION

Now, embodiments of the present invention will be described, referring to the accompanying drawings.

Embodiment 1

FIG. 1 is a schematic circuit diagram of an electronic keyboard musical instrument using the structure of the data processor 1 according to embodiment 1 of the present invention.

The electronic keyboard musical instrument is configured so that a DSP 2 applies an effect to a musical tone data output from a sound source 100, using an external memory 102 for delay processing as described later. One word as the unit of data processing in the DSP 2 has a 16-bit mode having a 16-bit unit and a 24-bit mode having a 24-bit unit. The 16-bit mode is normally used. When performing processing with high precision, the electronic keyboard musical instrument may be operated, being switched to the 24-bit mode according to panel setting on an operation panel 114 described later.

In the structure of this embodiment, three bus cycles (comprising 8 bits) form one group. In the case of the 16-bit mode, two of the three bus cycles are utilized. In the case of the 24-bit mode, the three bus cycles are utilized.

A CPU 111, which controls the entire electronic keyboard musical instrument and will be described later, is configured so as to be capable of not only accessing a RAM 113 but also accessing, through the DSP 2, the external memory 102 used by the DSP 2. In this case, the CPU 111 accesses the external memory, using the data bus width of the memory (8 bits=one word) as the data length since the CPU is not bound by the data length of the DSP 2.

As shown in FIG. 1, the electronic keyboard musical instrument is configured so that the CPU 111, a ROM 112, the RAM 113, a panel scan circuit 114a, a keyboard scan circuit 115a, the sound source 100 and the DSP 2 for effect processing are interconnected through a system bus 110. The system bus 110 is used to transmit and receive an address signal, a data signal, a control signal and other signals.

The CPU 111 controls the entire electronic keyboard musical instrument, being operated according to a control program stored in the ROM 112.

The ROM 112 stores various kinds of data to be referred to by the CPU 111 in addition to the control program.

The RAM 113 is used for temporarily storing various kinds of data when the CPU 111 performs various kinds of processing. The RAM 113 has registers, counters, flags and the like defined therein. Explanation will be made about main elements among these elements.

(a) a timbre setting flag: Data are stored to indicate through which channel a timbre generated from the sound source 100 is generated according to setting on the operation panel 114 described later.

(b) effect setting flags: A flag suited to a set timbre is automatically selected among plural kinds of selectable effects by timbre setting, and the corresponding setting data is stored.

(c) a 24-bit mode setting flag: When one word, which is the unit of data processing in the DSP 2, is set at a 24-bit mode by operation on the operation panel 114 described later, the corresponding setting data is stored (1: 24-bit mode, 0: 16-bit mode)

The penal scan circuit 114a is connected to the operation panel 114. The operation panel 114 has, e.g., panel switches, such as a switch for setting a timbre used in a performance, and a switch for applying a desired effect to an output musical tone. In this case, the timbre setting flag is set by selecting a desired musical tone through the operation panel 114, and the effect setting flags are set by automatically selecting an effect to be applied to a musical tone at the time of outputting the musical tone.

The operation panel 114 has a switch provided thereon to set a 24-bit mode wherein the DSP 2 for effect processing performs processing in units of 24 bits. When this mode is set, the 24-bit mode setting flag is set. When this mode is not set, the DSP 2 performs processing in units of 16 bits. Although not shown, there are also provided an LED indicator for indicating the setting states of the respective switches, an LCD for displaying various kinds of messages, and the like.

The panel scan circuit 114a scans each switch on the operation panel 114 in response to a command from the CPU 111 and prepares a panel data based on a signal indicative of a switch-on state or a switch-off state of each switch obtained by this scanning operation, each one bit in the panel data corresponding to each switch. For example, each one bit represents the switch-on state by "1" and a switch-off state by "0". The panel data is transmitted to the CPU 111 through the system bus 110. The panel data is used to determine whether the on-event or the off-event of a switch on the operation panel 114 has been caused or not.

The panel scan circuit 114a transmits a display data from the CPU 111 to the LED indicator and the LCD on the operation panel 114. By this operation, according to the data transmitted from the CPU 111, the LED indicator is turned on or off, and a message is displayed on the LCD.

The keyboard scan circuit 115a detects a key-on data generated at a keyboard 115. The keyboard 115 has the respective keys provided with a two-position switch. When it is detected that a key on the keyboard 115 has been depressed to a certain depth or above, a key-on signal corresponding to the pitch data (key number) of the depressed key is generated, and a velocity is generated based on the speed of the depressed key, which has passed between two positions. These data are transmitted as key-on data to the keyboard scan circuit 115a. Examples of the two-position switch include an optical sensor, a pressure sensor or other sensors, which can detect that the corresponding key has been depressed to a certain depth or above. When the keyboard scan circuit 115a receives the key-on data from a two-position switch, the keyboard scan circuit transmits the data to the CPU 111.

Based on the reference to the timbre setting flag in the RAM 113 by the CPU 111, key-on data, which are transmitted from the keyboard scan circuit 115a, are transmitted to the sound source 100 so as to correspond to the respective channels. At this time, the CPU 111 also refers to the effect setting flags and the 24-bit mode setting flag. Based on this reference, a command for application of a desired effect and a command as to whether the unit of processing (one word) in the DSP for performing processing for effect application is the 24-bit mode or the 16-bit mode (a command as to whether the 24-bit mode is set or not) are transmitted to the DSP 2.

The sound source 100 uses a waveform memory 101 and performs memory access to the waveform memory. In the other words, there is adopted a normal sound source structure wherein a readout address is issued to the waveform memory 101 to read out the corresponding original data from the waveform memory, and wherein after the original data thus read out is interpolated, the interpolated data is multiplied by the envelope for each timbre generated by the same circuit. The multiplied results are accumulated so as to correspond to channels with the waveform data of the respective timbres set therein, and the accumulated data are output as a waveform data.

Figure 2:
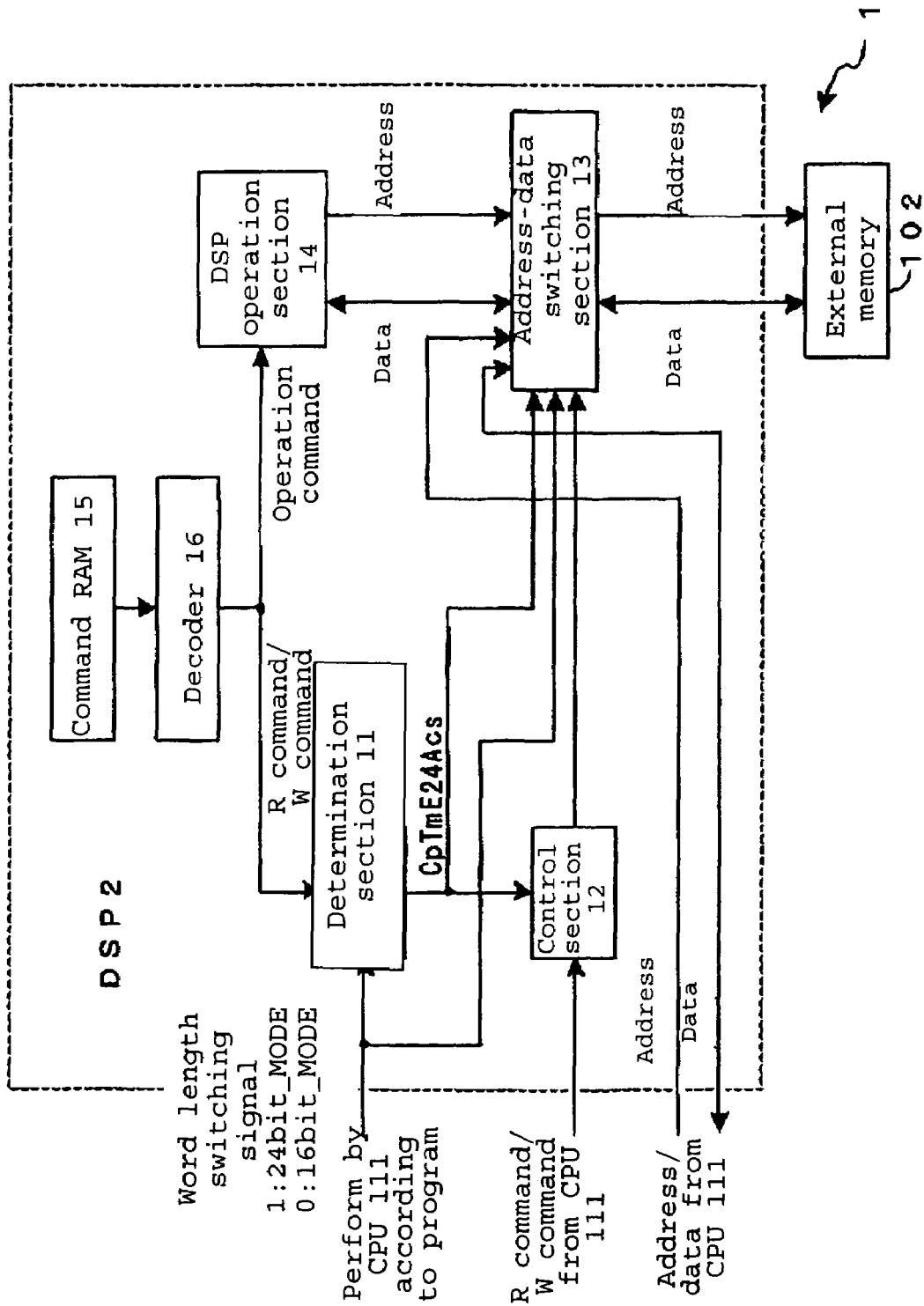
FIG. 2 is a schematic view of the internal circuit of a DSP 2 in the data processor according to the present invention.

The DSP 2 is configured so as to have the structure of an embodiment of the present invention shown in FIG. 2, wherein a DSP operation section 14, a command RAM 15, a decoder 16 and the like are included as usual. According to a command from the CPU 111, the DSP applies a desired effect to a musical tone data received from the sound source 100 and outputs the musical tone data toward a D/A converter circuit 116.

A command, which the DSP receives from the CPU 111, is prepared based on the effect setting flags and the 24-bit mode flag, which have been referred to the CPU 111. In other words, when the operation panel 114 is scanned, the CPU 111 refers to the effect setting flag representing an effect corresponding to a selected musical tone, and prepares a command to be issued to the DSP 2, the command instructing what effect is applied to a musical tone to be output. The 24-bit mode flag, which is set by a panel switch operation made by a musical performer, is also referred to. If this flag is set, the one word in the DSP 2 is switched from a 16-bit unit to a 24-bit unit.

The DSP 2 uses the external memory 102 for storing digital delay data. At that time, when the 16-bit mode is set, the CPU is always allowed to access the external memory 102 since one bus cycle is free among the three bus cycles. On the other hand, when the 24-bit mode is set, while the DSP 2 is performing processing, the CPU is not allowed to access the external memory 102 since the three bus cycles are normally occupied. However, when the DSP 2 is not performing processing, the three bus cycles are all free. This embodiment is configured so that one bus cycle among the three bys cycles can be utilized to allow the CPU 111 to access the external memory 102 in this case. The details will be described later.

A waveform data, to which a desired effect has been applied by the DSP 2, is input into the D/A converter circuit 116, is subjected to digital-analog conversion, is amplified by an amplifier 117 and is output as a musical tone from a speaker 118.

FIG. 2 is a schematic view of the internal circuit of the DSP 2 as described above. The DSP includes not only normal elements, such as the DSP operation section 14, the command RAM 15, and the decoder 16, but also a determination section 11, a control section 12 and an address-data switching section 13 disposed between the external memory 102 and the CPU through the bus 110. These elements are involved to control the access to the external memory from the CPU 111.

Figures 3, 4:
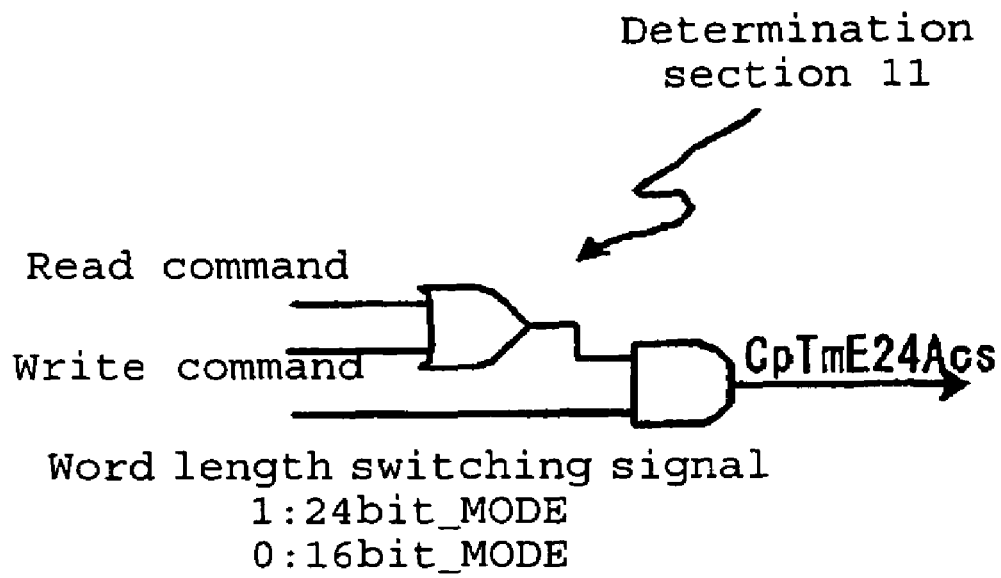
FIG. 3 is a schematic view showing the details of the structure of a determination section 11.
FIG. 4 is a schematic view showing how signal processing is performed by the structure of the determination section 11.

The determination section 11 is configured to determine whether the DSP 2 is accessing to the external memory 102 or not. FIG. 3 is a schematic view showing the details of the structure of the determination section 11. As shown in this figure, the determination section 11 comprises an OR circuit, to which a read command (R command) or a write command (W command) for the DSP 2 is input from the decoder 16, and an AND circuit, to which an output of the OR circuit and a word-length switching signal are input, the CPU referring to the 24-bit mode flag and transmitting the word-length switching signal. The output of the AND circuit is output as a signal indicating whether the CPU is allowed to access the external memory (when CpTmE24Acs is 0, the access is not allowed, while when CpTmE24Acs is 1, the access is allowed).

FIG. 4 is a schematic view showing how the output signal (CpTmE24Acs) from the circuit of the determination section 11 is changed according to a read command (R command) and a write command (W command) output from the decoder 16 of the DSP 2 in the 24-bit mode (=1) and the 16-bit mode (=0).

When the 16-bit mode is set (=0), the CPU is always allowed to access the external memory 102 since one bus cycle is free among the three bus cycles. In other words, the above-mentioned signal (CpTmE24Acs) is constantly 0, and one bus cycle among the three bus cycles is constantly ready to allow the CPU 111 to access the external memory 102.

On the other hand, when the 24-bit mode is set (=1), the three bus cycles are normally occupied while DSP 2 is performing processing (an R command or a W command is issued). Accordingly, the CPU is not allowed to access the external memory 102. However, while the DSP 2 is not performing processing (in the states designated by N in this figure), the three bus cycles are all free, and one bus cycle among the three bys cycles can be utilized to allow the CPU 111 to access the external memory 102.

According to the presence and absence of a signal from the determination section 11 (CpTmE24Acs=0 or 1), the control section 12 controls whether the CPU is allowed to access the external memory 102 or not. In other words, this embodiment is configured so that the access to the external memory 102 from the CPU 111 is placed in a wait state while the above-mentioned signal (CpTmE24Acs) is 1.

Figure 5:
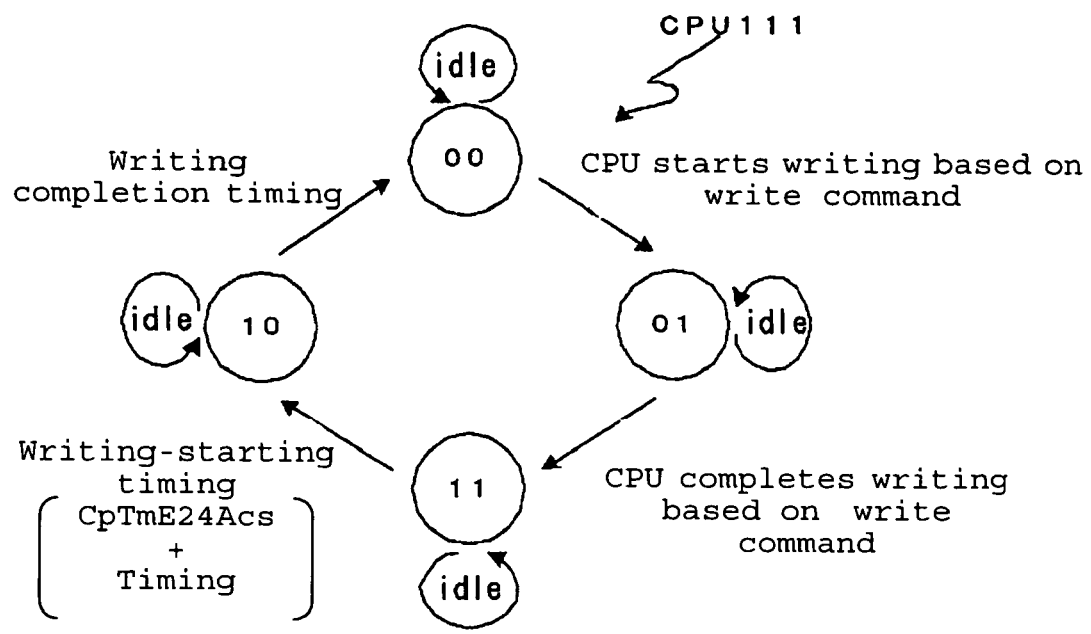
FIG. 5 is a state transition diagram showing a state machine for controlling the access to an external memory 102 from a CPU 111.

FIG. 5 is a state transition diagram showing a state machine for controlling the access to the external memory 102 from the CPU 111 (in a case where a W command is issued).

When the control section 12 is in an initial (00) state, the control section maintains the initial state as long as there is no change in the signal input from externally (idle).

When a write command (W command) is output from the CPU 111, the control section transits into a state (01) to start writing on a register for command reception in the DSP 2 according to the write command (W command). While writing continues, the control section maintains this new state (idle).

When writing on a register for command reception in the DSP 2 from the CPU 111 according to the write command (W command) completes, the control section transits into a state (11) to have completed the command reception and maintain this state (idle). In the meantime, a write command (W command) from the CPU 111 is placed in a wait state by the control section 12 in connection with the memory access to the external memory 102.

After that, when the signal from the determination section 11 (CpTmE24Acs) is 0, and when it is in a bus cycle timing state (10) denoted by "CPU" in FIG. 6 described later, a command is first issued to the address-data switching section 13 described later, making a write command (W command) from the CPU 111 effective. As a result, the addressing to the external memory from the CPU 111 and data writing on the designated address are performed through the address-data switching section 13. The determination section maintains the state to address the external memory and to write the data (idle).

At the completion timing of this bus cycle, i.e., at the completion timing of the write command (W command), the determination section returns to the initial state (00). When a read command (R command) is issued, almost the same processing is performed.

The address-data switching section 13 is configured to perform input/output operations in such a way that the addressing of the external memory 102 and the communication of data with the external memory are switched between the DSP operation section 14 and the CPU according to a command from the control section 12.

As shown in FIG. 2, the word switching signal output based on reference to the 24-bit mode flag made by the CPU 111 and the signal from the determination section 11 (CpTmE24Acs), in addition to the above-mentioned command from the control section 12, are input to the address-data switching section. Based on these inputs, the addressing of the external memory 102 and the communication of data with the external memory are switched between the DSP operation section 14 and the CPU 111. FIG. 6 shows how bus cycles are switched in the address-data switching section 13 in this processing.

In the structure according to this embodiment, the number of the bus cycles is three at the maximum. In a case where a data length, which is required to make full use of the three bus cycles, is selected, i.e., a case where the 24-bit mode is selected, when the determination section 11 determines that the DSP 2 is accessing to the external memory 102, the control section 12 commands to place a read command (R command) and a write command (W command) from the CPU 111 to the external memory 102 in the wait state since the three bus cycles of a low-order byte access (L), a middle-order byte access (M) and a high-order byte access (H) in the 24 bits are fully used as shown in a middle portion of FIG. 6.

Figure 6:
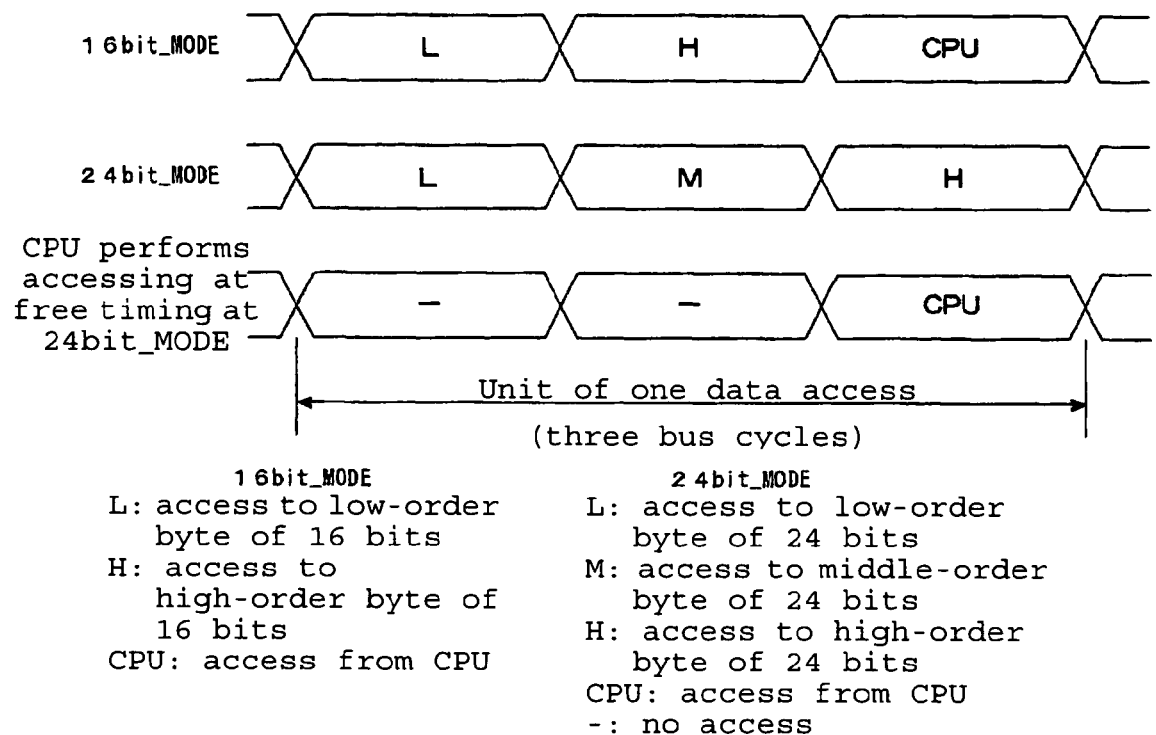
FIG. 6 is a schematic view showing how bus cycles are switched in an address-data switching section 13 when an address and a data are switched between a DSP operation section 14 and the CPU 111.

Even in a case where the 24-bit mode is selected, when the determination section 11 determines that the DSP 2 is not accessing to the external memory 102, the address-data switching section 13 allows the CPU 111 to issue a read command (R command) and a write command (W command) to the external memory 102 as shown in a lower portion of FIG. 6.

On the other hand, in a case where a data length, the data access of which is required to make full use of the maximum bus cycles (the three bus cycles), is not selected, i.e., a case where the 16-bit mode is selected, only the two bus cycles of a low-order byte access (L) and a high-order byte access (H) following the low-order byte access in the 16 bits are utilized as shown in an upper portion of FIG. 6. The control section 11 commands the address-data switching section 13 to make the CPU 111 accessible to the external memory 102, allowing the CPU 111 to issue a read command (R command) and a write command (W command) to the external memory 102.

In this case, the CPU 111 can always access the external memory 102 since the third bus cycle constantly serves as a free cycle.

Figure 7:
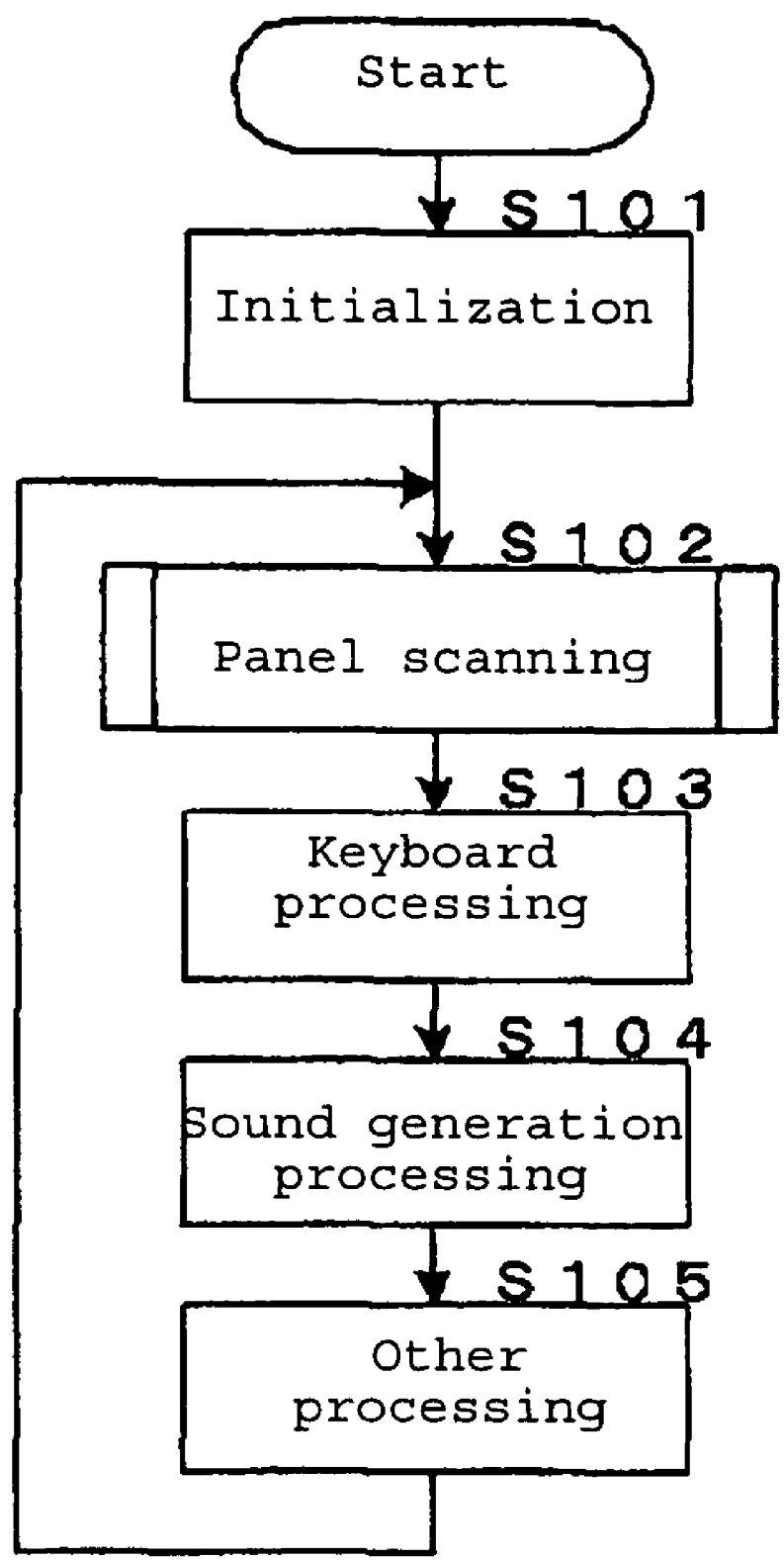
FIG. 7 is a flowchart showing the main processing for the electronic keyboard musical instrument according to Embodiment 1.

FIG. 7 is a flowchart showing the main processing of the electronic keyboard musical instrument according to Embodiment 1. The main processing routine starts when the power is turned on. Specifically, when the power is turned on, the CPU 111, the RAM 113, the respective scan circuits 114a and 115a, the external memory 102 and the other elements are initialized (Step S101). In the initialization step, the CPU 111 and the hardware in the DSP 2 are set to the initial states, and the registers, the counter, the flags and the like defined in the RAM 113 are set to the initial values.

Upon completion of the initialization step, the operation panel 114 is scanned as described later (Step S102).

Then, the keyboard 11S is subjected to keyboard processing (the keyboard is scanned) (Step S103). In the keyboard-processing step, key-on data are prepared according to key-on operation in the electronic keyboard musical instrument, and the key-on data are output to the sound source 100 described above.

After that, the sound source 100 and the DSP 2 are used, based on the key-on data, to perform sound generation processing (and sound-eliminating processing according to key-off operation) (Step S104).

Next, other operations are performed (Step S105). In processing for the other operations, the other operations than the processing described above, such as ON/OFF processing of pedals, and MIDI processing, are performed.

Then, the operation returns to Step S102, and the steps of from Step S102 to S105 are repeated.

Figure 8:
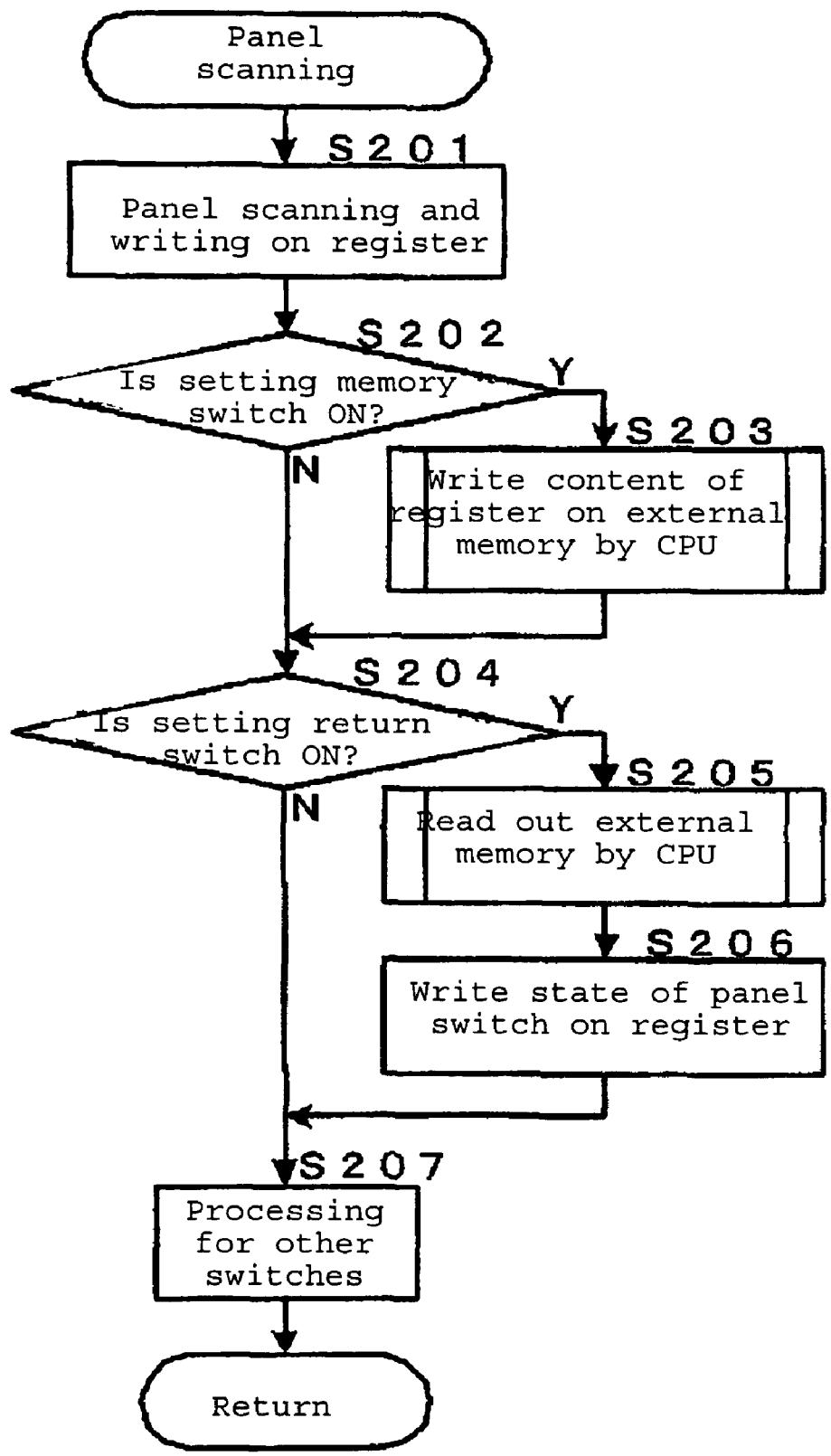
FIG. 8 is a flowchart showing the procedure in the panel scan in Step S102 shown in FIG. 7.

FIG. 8 is a flowchart showing the procedure in the panel scan in Step S102 shown in FIG. 7.

When the panel scan circuit 114a detects that a panel operation is performed on the operation panel 114, the register for flag processing is written so as to correspond to the panel operation (Step S201).

In this step, e.g., the timbre used in a performance, the application of a desired effect to an output musical sound, and the 24-bit mode are set by the operation panel 114 as described above. When such setting is made, the timbre setting flag is set according to timbre selection on the operation panel 114, and the effect to be applied to the output of the timbre is automatically selected, setting the effect setting flags. These data are once written on registers in the RAM 113.

Next, the CPU 111 refers to the state of the register of a setting memory switch for temporarily storing the setting state of a panel switch on the operation panel, in order to check out whether the switch is turned on nor not (Step S202). When the switch is turned on (Y: Step S203), the CPU 111 moves the setting state of the panel switch from the register in the RAM 113 to a register set on the external memory 102 to be used by the DSP 2 (Step S203). In other words, the external memory 102 is set so as to be capable of being utilized in the same way as the RAM 113. This operation is helpful to increase the free area in the RAM 113 for keyboard processing and sound generation processing, which are performed at a later stage.

The CPU 111 also refers to the state of the register of a setting return switch for returning to the former setting state of a panel switch, which is temporarily stored in a register set in the external memory 102 to be used by the DSP 2. Based on this reference, the CPU checks out whether the switch is turned on nor not (Step S204). When the switch is turned on (Y in Step S204), the CPU reads out the former setting state of the panel switch from the external memory 102 (Step S205).

Likewise, the CPU 111 causes the former setting state of the panel switch to be written on a register set in the RAM 113 (Step S206).

After that, the processing for the other switches is performed (Step S207), and the operation returns to the main routine.

Figure 9:
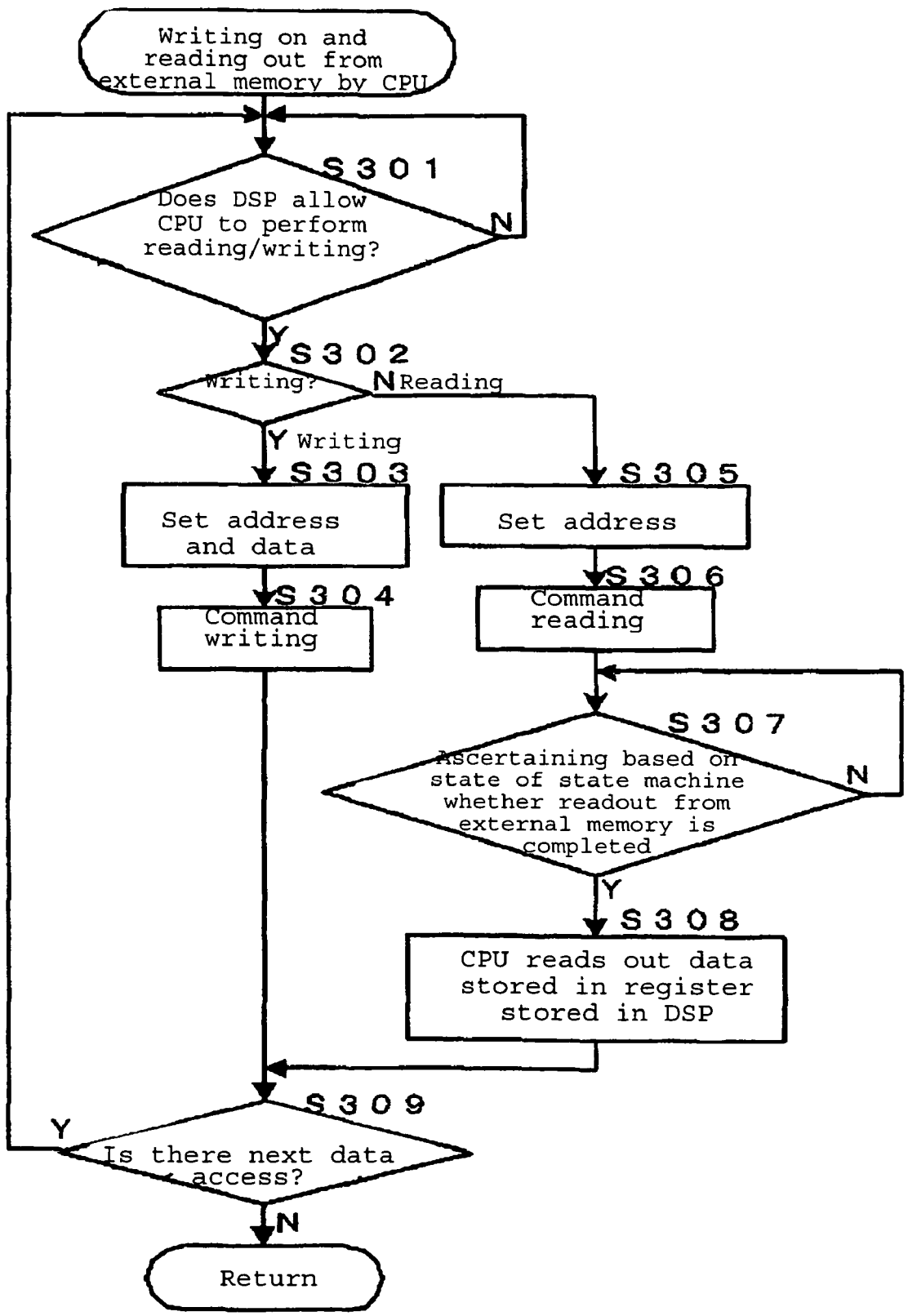
FIG. 9 is a flowchart showing the flows of a write operation in and a read out operation from the external memory 102 by the CPU 111 in Step S203 and Step S205 shown in FIG. 8.

FIG. 9 is a flowchart showing the flows of a write operation in and, a readout operation from the external memory 102 by the CPU 111 in Step S203 and Step S205 shown in FIG. 8.

As shown in this figure, it is first checked out whether a command from the CPU 111, which commands to read out a data from or write a data on the external memory 102, is acceptable to the DSP 2 or not (Step S301). An example where such a command is not acceptable to the DSP 2 includes a case where the DSP 2 has not completed the execution of a write command or a read command previously commanded when the state machine of FIG. 5 is in a state other than (00).

When the check reveals that such a command is not acceptable to the DSP 2 (N in Step S301), the operation returns to Step S301, and the above-mentioned checking step is repeated.

On the other hand, when such a command is acceptable to the DSP 2 (Y in Step S301), the CPU 111 branches the processing according to whether a write command is issued or not (Step S302).

When it is determined that a write command is issued (Y in Step S302), a data to be written on the external memory 102 from the CPU 111 and the specified address are set on the DSP 2 (Step S303). And, the write command is issued to the DSP 2 (Step S304).

After that, the operation of the state machine shown in FIG. 5 starts in the DSP 2. At a timing instructed by the determination section 11, the control section 12 issues a command to the address-data switching section 13 to write the data on the external memory 102.

On the other hand, when it is determined that a read command is issued (N in Step S302), the address for a data to be read out from the external memory 102 to the CPU 111 is set on the DSP 2 (Step S305). And, the read command is issued to the DSP 2 (Step S306).

After that, a read operation of the state machine similar to the operation shown in FIG. 5 starts in the DSP 2. At a timing instructed by the determination section 11, the control section 12 issues a command to the address-data switching section 13 to read out the corresponding data from the external memory 102 on an internal register in the DSP 2.

The CPU 111 checks out whether the DSP 2 has completed the execution of the read command issued by the CPU 111 (the CPU 111 ascertains the state of the state machine in the DSP 2 in Step S307).

When the read operation from the external memory 102 has not been completed (N in Step S307), the above-mentioned checking operation is repeated until the read operation is completed. When the read operation has been completed (Y in Step S307), the data, which is temporarily stored in the internal register in the DSP 2 when the read operation has been completed, is read out, ending the read operation (Step S308).

After the write operation in Step 304 or the read operation in Step S308 is completed, the CPU 111 checks out whether there is a next data to be written or read out, or not (Step S309).

When there is such a data (Y in Step 309), the operation returns to Step S301, and the above-mentioned steps are repeated. Conversely, when there is not such a data (N in Step 309), the operation returns to Step S204 or Step S206 described above in connection with FIG. 8.

In accordance with the structure of Embodiment 1 described above in detail, in the 24-bit mode wherein the three bus cycles are fully utilized for the access from the DSP 2 to the external memory 102 with the data length having a maximum of three bus cycles, when the determination section 11 determines that the DSP 2 is accessing the external memory 102, the control section 12 commands that the access to the external memory 102 from the CPU 111 is placed in the wait state since the three bus cycles are fully utilized by the DSP 2.

However, when the determination section 11 determines that the DSP 2 is not accessing the external memory 102, the address-data switching section 13 allows the CPU 111 to access the external memory 102 at the last bus cycle in the three bus cycles.

On the other hand, in the 16-bit mode wherein the access from the DSP 2 to the external memory 102 is performed with the data length having two bus cycles, the control section 12 issues a command to the address-data switching section 13 to allow the CPU 111 to access the external memory 102, utilizing the third bus cycle as a free bus cycle since only the two bus cycles are utilized. In this case, the CPU 111 can always access the external memory 102 since the third bus cycle is always a free bus cycle.

Embodiment 2

Figure 10:
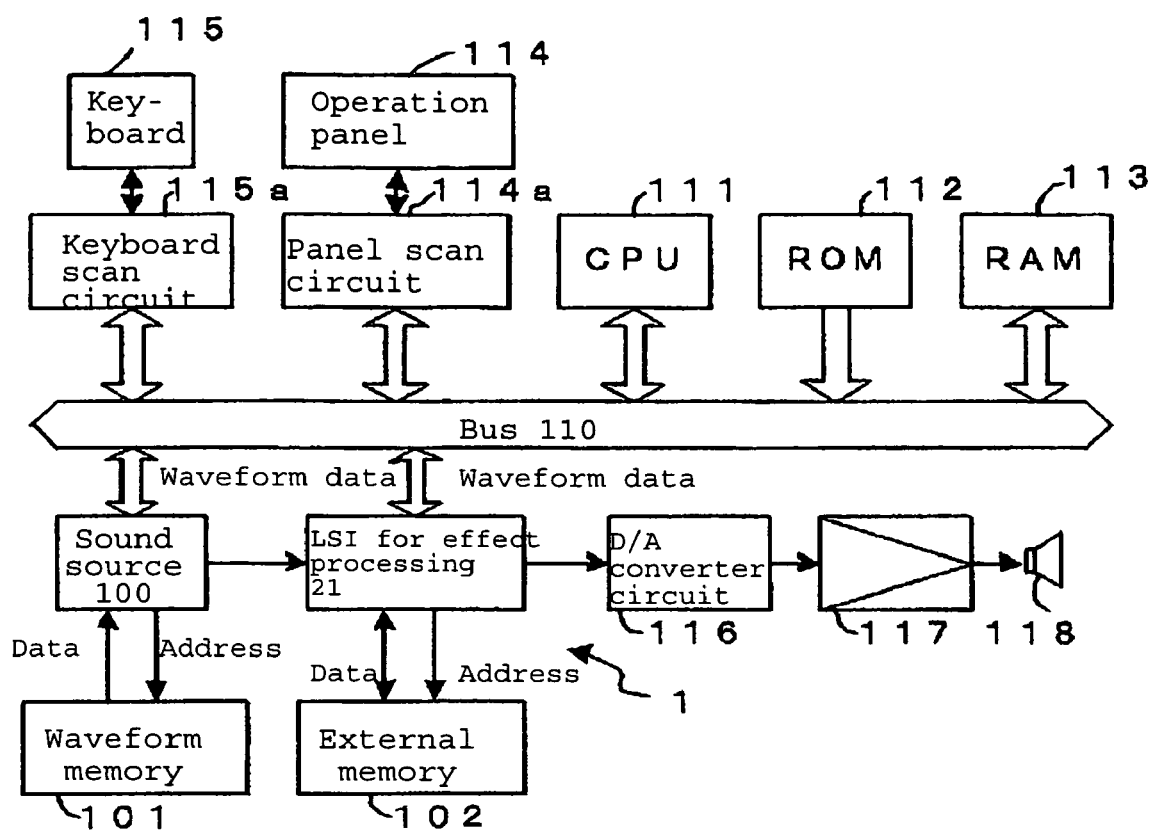
FIG. 10 is a schematic circuit diagram of an electronic keyboard musical instrument showing the structure of the data processor according to Embodiment 2 of the present invention.

FIG. 10 is a schematic circuit diagram of an electronic keyboard musical instrument using the structure of the data processor 1 according to embodiment 2 of the present invention.

The electronic keyboard musical instrument is configured so that not only plural kinds of timbers can be set but also two kinds of effects to be applied to these timbres can be simultaneously set. Examples of the setting of the two kinds of effects include 1) a case where two kinds of effects are automatically determined in the setting of the timbres, and 2) a case where the two kinds of effects to be added are determined by a musical performer, either cases being selected by a panel operation on an operation panel described later.

As shown in FIG. 10, the electronic keyboard musical instrument is configured to have a substantially similar structure to Embodiment 1, wherein a CPU 111, a ROM 112, a RAM 113, a panel scan circuit 114a, a keyboard scan circuit 115a, a sound source 100 and an LSI for effect processing 21 are interconnected through a system bus 110. The system bus 110 is used to transmit and receive an address signal, a data signal, a control signal and other signals.

The CPU 111 controls the entire electronic keyboard musical instrument, being operated according to a control program stored in the ROM 112.

The ROM 112 stores various kinds of data to be referred to by the CPU 111 in addition to the control program.

The RAM 113 is used for temporarily storing various kinds of data when the CPU 111 performs various kinds of processing. The RAM 113 has registers, counters, flags and the like defined therein. Explanation will be made about main elements among these elements.

(a) a timbre setting flag: Data are stored to indicate through which channel a timbre generated from the sound source 100 is generated according to the setting on an operation panel 114 described later.

(b) effect setting flags: One or two flags suited to a set timbre are automatically selected among plural kings of selectable effects by timbre setting, or one or two flags suited to a set timbre are directly selected by a musical performer, and the corresponding setting data are stored.

(c) a 24-bit mode setting flag: In a case where a selected effect is determined by timbre setting or by a musical performer in connection with application of an effect to a musical tone data generated from the sound source 100, the electronic keyboard musical instrument according to this embodiment causes the CPU 111 to check how many effect setting flags are set. When the number of the set effect setting flags is two, a flag indicating the two-chip mode is set (=1) since two DSPs (DSP 2a and DSP 2b) are utilized in the LSI for effect processing 21 described later. At this time, the CPU 111 refers to the two-chip mode flag and outputs a mode-switching signal (0: one-chip mode, 1: two-chip mode).

The penal scan circuit 114a is connected to the operation panel 114. The operation panel 114 has, e.g., panel switches, such as a switch for setting a timbre used in a performance, and a switch for applying a desired effect to an output musical tone. In this case, the timbre setting flag is set by selecting a desired musical tone through the operation panel 114, and the effect setting flag is set by automatically selecting an effect to be applied to the musical tone at the time of outputting the musical tone. In some cases, an effect setting flag is modified, the two-chip mode flag is set and the LSI for effect processing 21 is set in the two-chip mode by direct operation of, e.g., a panel switch on the operation panel 114 made by a performer as described above. Although not shown, there are also provided an LED indicator for indicating the setting states of the respective switches, an LCD for displaying various kinds of messages, and the like.

When the two-chip mode flag is reset by the timbre setting described above or by operation of the operation panel 114 made by a performer, either one of the DSP 2a and the DSP 2b in the LSI for effect processing 21 is ready for use, outputting a musical tone without any effect being applied or with a single effect being applied. When the two-chip mode flag is set by modification in the timbre setting or by operation of the operation panel 114, a musical tone is output with two effects being applied.

The panel scan circuit 114a scans each switch on the operation panel 114 in response to a command from the CPU 111 and prepares a panel data based on a signal indicative of a switch-on state or a switch-off state of each switch obtained by this scanning operation, each one bit in the panel data corresponding to each switch. For example, each one bit represents the switch-on state by "1" and a switch-off state by "0". The panel data is transmitted to the CPU 111 through the system bus 110. The panel data is used to determine whether the on-event or the off-event of a switch on the operation panel 114 has been caused or not.

The panel scan circuit 114a transmits a display data from the CPU 111 to the LED indicator and the LCD on the operation panel 114. By this operation, according to the data transmitted from the CPU 111, the LED indicator is turned on or off, and a message is displayed on the LCD.

The keyboard scan circuit 115a detects a key-on data generated at a keyboard 115. The keyboard 115 has the respective keys provided with a two-position switch. When it is detected that a key on the keyboard 115 has been depressed to a certain depth or above, a key-on signal corresponding to the pitch data (key number) of the depressed key is generated, and a velocity is generated based on the speed of the depressed key, which has passed between two positions. These data are transmitted as key-on data to the keyboard scan circuit 115a.

Examples of the two-position switch are an optical sensor, a pressure sensor or other sensors, which can detect that the corresponding key has been depressed to a certain depth or above. When the keyboard scan circuit 115a receives the key-on data from a two-position switch, the keyboard scan circuit transmits the data to the CPU 111.

Based on the reference to the timbre setting flag in the RAM 113 by the CPU 111, key-on data, which are transmitted from the keyboard scan circuit 115a, are transmitted to the sound source 100 so as to correspond to the respective channels. At this time, the CPU 111 also refers to the effect setting flag and the two-chip mode flag. Based on this reference, a command for application of a required effect and a command on the number of the required DSP chips (a command indicating whether the two-chip mode is set or not) are transmitted to the LSI for effect processing 21.

The sound source 100 uses a waveform memory 101 and performs memory access to the waveform memory. In other words, there is adopted a normal sound source structure wherein a readout address is issued to the waveform memory 101 to read out the corresponding original data from the waveform memory, and wherein after the original data thus read out is interpolated, the interpolated data is multiplied by the envelope for each timbre generated by the same circuit. The multiplied results are accumulated so as to correspond to channels with the waveform data of the respective timbres set therein, and the accumulated data are output as waveform data.

Figure 11:
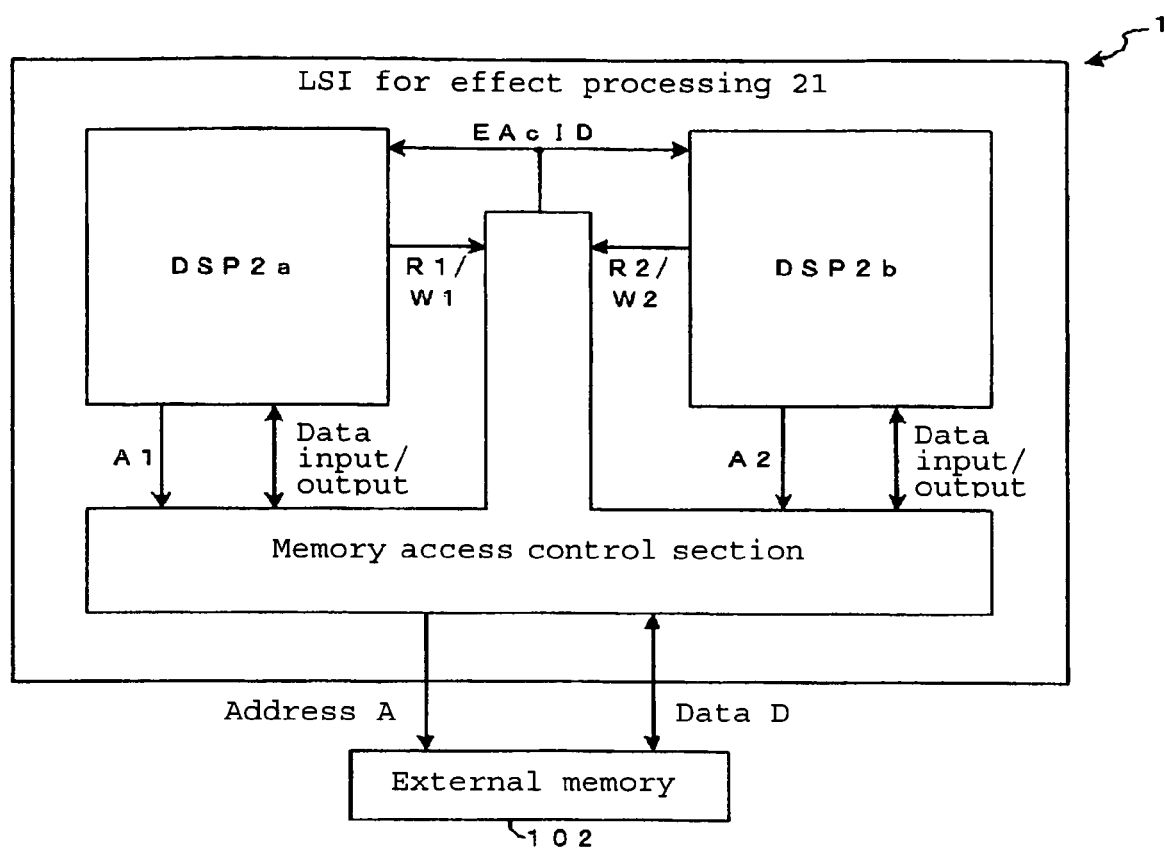
FIG. 11 is a schematic view of the internal circuit of an LSI for effect processing 21.

As shown in FIG. 10 and FIG. 11, the LSI for effect processing 21 includes the two DSP 2a and DSP 2b therein. According to a command from the CPU 111, a required effect is applied to a musical tone data received from the sound source 100, and the musical tone data with the effect applied thereto is output to a D/A converter circuit 116.

The command received from the CPU 111 is prepared based on the effect setting flag and the two-chip mode flag, which have been referred to the CPU 111. In other words, when the operation panel 114 is scanned, the CPU 111 refers to the effect setting flag and checks out what effect is applied to a musical tone to be output, and the CPU prepares a command to be issued to the LSI for effect processing 21. In this time, the CPU places the two-chip mode flag in a proper set state, depending on whether the use of a single DSP in the LSI for effect processing 21 is sufficient or the use of the two DSPs is required for such effect processing. Further, when sound generation is actually performed, the CPU 111 commands the LSI for effect processing 21 as to whether the two DSPs 2a and 2b are utilized according to the setting of the two-chip mode flag, or only one of the two DSPs (for example the DSP 2a) is utilized. After that, the CPU issues a command for effect processing, which is required for actual effect processing.

As described above, the LSI for effect processing 21 uses an external memory 102 for storing digital delay data. When the two-chip mode is set, the two DSPs 2a and 2b share the external memory 102. The details will be described later.

A waveform data, to which a desired effect has been applied by the LSI for effect processing 21, is input into the D/A converter circuit 116 to be suppressed to digital-to-analog conversion, is amplified by an amplifier 117 and is output as a musical tone from a speaker 118.

FIG. 11 is a schematic view of the internal circuit of the LSI for effect processing 21 as described above. The LSI for effect processing 21 includes the DSPs 2a and 2b in a single package, and the memory access from these DSPs to the external memory 102 is controlled by using a memory access control section 3.

The DSPs 2*a* and 2*b*, which are used in the structure according to this embodiment, have sixty-four memory access timings per sampling cycle. A read command (R1/R2), or a write command (W1/W2), which has been output from each of the DSP 2*a* and 2*b* in the two-chip mode, is once received by the memory access control section 3. The memory access control section determines which DSP chip is allowed to issue a command. According to this determination, a chip enable signal (EAcID) is issued to the DSP 2*a* and DSP 2*b*. Based on this signal, the external memory 102 is addressed (A1 or A2), and a data is input to or output from the DSP 2*a* or the DSP 2*b*.

Figure 12:
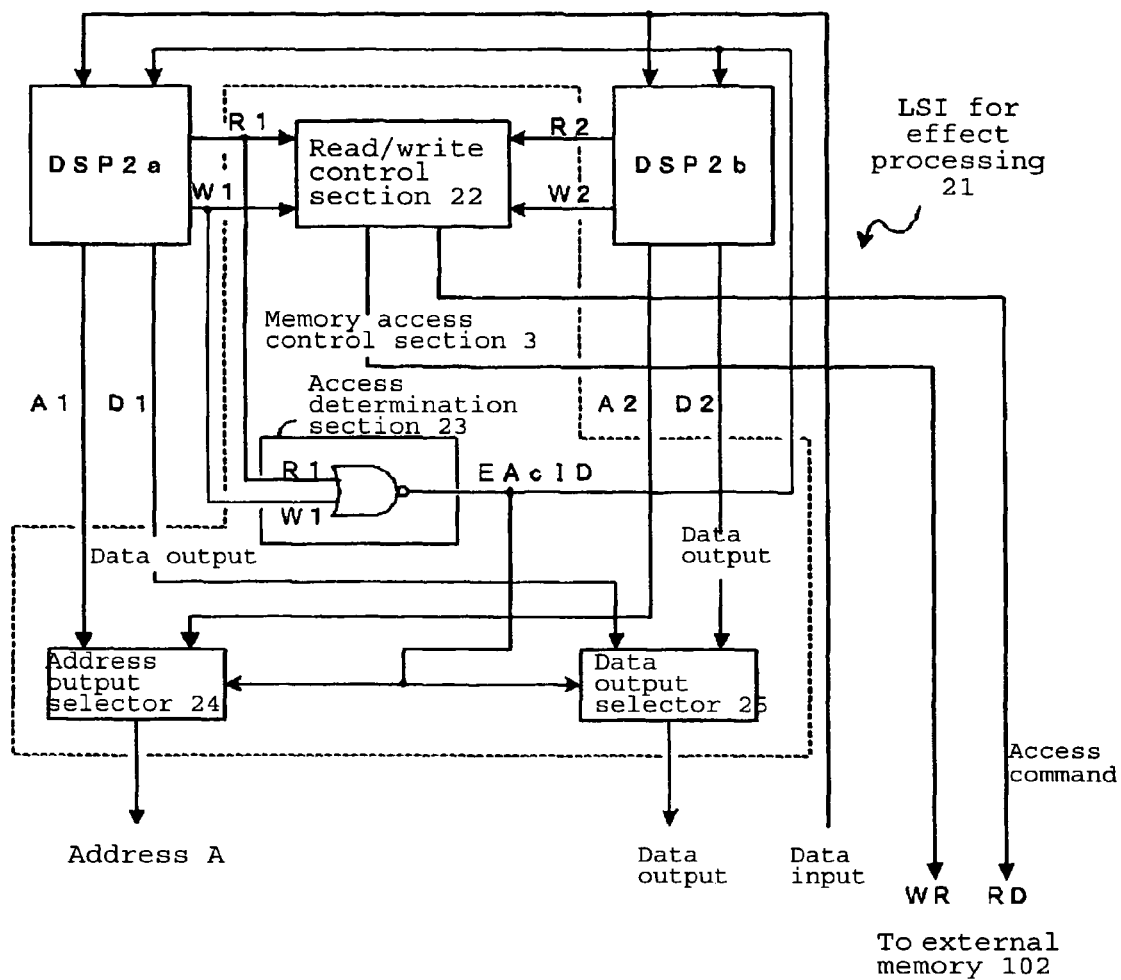
FIG. 12 is a schematic view showing the circuit structure of a memory access control section 3 in the is internal structure of LSI for effect processing 21.

FIG. 12 is a schematic view showing, in particular, the circuit structure of the memory access control section 3 (indicated by a dotted line in this figure) in the internal structure of the LSI for effect processing 21. The memory access control section includes a read/write control section 22, an access determination section 23, an address output selector 24 and a data output selector 25.

When both the DSP 2*a* and the DSP 2*b* issue a read command (R1/R2) or a write command (W1/W2) at the same timing, the read/write control section 22 exercises control of which one of these commands should be determined to be effective.

In other words, when both the DSP 2*a* and the DSP 2*b* issues a command (W/R) or do not issue any command as shown in FIG. 13, the access to the external memory 102 is not performed (N after control: no access). On the other hand, either one of the DSP 2*a* and the DSP 2*b* issues a command (W/R), the access to the external memory 102 is made effective.

When both the DSP 2*a* and the DSP 2*b* issue a read command (R1/R2) or a write command (W1/W2) at the same timing, the access determination section 23 determines which DSP is allowed to perform memory access.

In this embodiment, the access determination section comprises a NOR circuit, which has input ports for a read command R1 and a write command W1 from the DSP 2*a* and an output port for outputting a chip enable signal (EAcID) as shown in FIG. 12. When none of the commands are issued from the DSP 2*a*, the chip enable signal (EAcID) is output as "1", allowing the DSP 2*b* to perform memory access as shown in FIG. 14.

Conversely, when either one of the commands is issued from the DSP 2*a*, the chip enable signal (EAcID) is output as "0", allowing the DSP 2*a* to perform memory access.

The address output selector 24 outputs an address A1 or A2 transmitted from the DSP 2*a* or the DSP 2*b* according to a chip enable signal (EAcID) from the access determination section 23. These addresses are used to specify an address to write a data on the external memory 102 or to read out a data from the external memory 102.

The data output selector 25 outputs a data D1 or D2 transmitted from the DSP 2*a* or the DSP 2*b*, based on the chip enable signal (EAcID). The output data is a data, which is supposed to be written on the external memory 102 and which is being processed by the DSP 2*a* or the DSP 2*b*.

Figure 15:
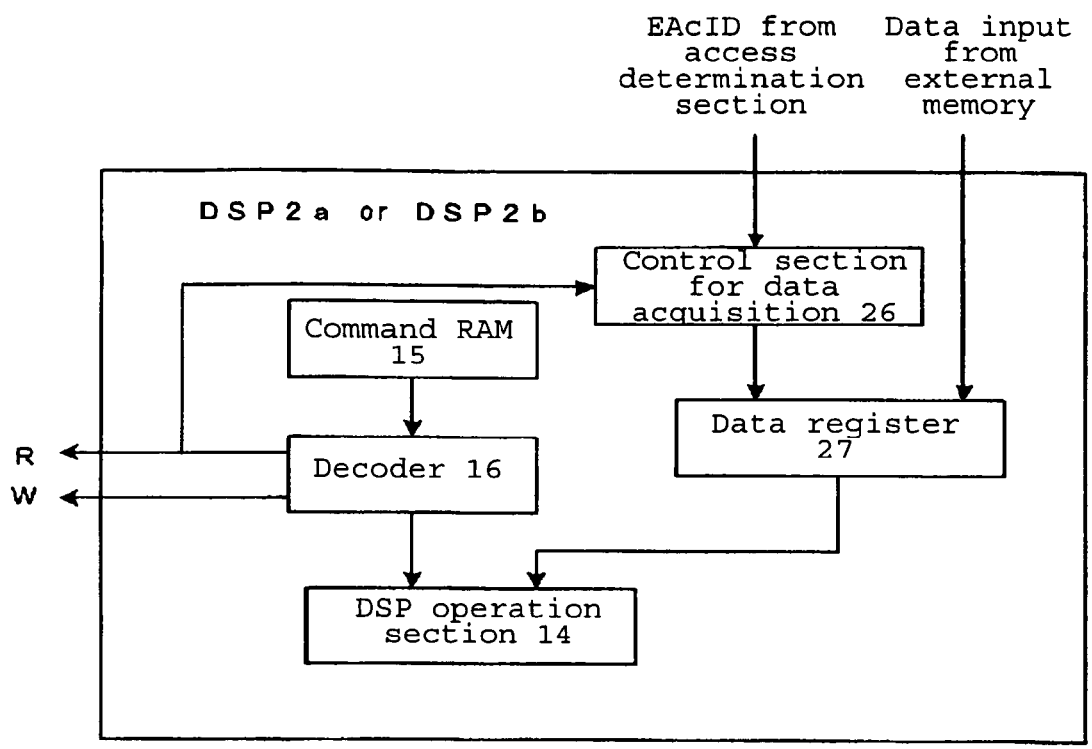
FIG. 15 is a schematic view of the circuit structure of the DSP 2a or the DSP 2b housed in a single package as the internal structure of the LSI for effect processing 21.

FIG. 15 is a schematic view of the circuit structure of each of the DSP 2*a* and the DSP 2*b*, which are housed in a single package among the internal elements of the LSI for effect processing 21. Each of the DSP 2*a* and the DSP 2*b* includes normal DSP elements, such as a data register 27 for temporarily storing a data for data signal processing, a command RAM 15 for storing an instruction transmitted from the CPU 111, a decoder 16 for decoding the instruction, and a DSP operation section 14 for subjecting a data stored in the data register 27 to processing (such as addition and multiplication) according to the decoded instruction.

In the structure according to this embodiment, each of the DSP 2*a* and DSP 2*b* includes a control section for data acquisition 26, which allows the data register 27 to acquire a data read out from the external memory 102, according to the chip enable signal (EAcID) from the access determination section 23. Since this data acquisition is caused by a data read command R from the DSP per se, the read command from the decoder 16 is also input into the control section for data acquisition.

Figure 16:
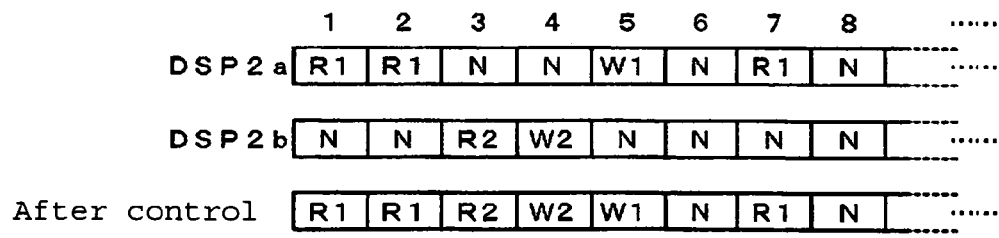
FIG. 16 is a schematic view of commands from the DSP 2a and the DSP 2b and the control results of the access control section 3 at sixty-four access timings in one sampling cycle when the LSI for effect processing 21 is operated at a two-chip mode.

FIG. 16 is a schematic view showing commands issued by the DSP 2*a* and the DSP 2*b* and the functional states of the memory access control section 3 in sixty-four access timings in sampling cycle (44.1 KHz) when the LSI for effect processing 21 having the above-mentioned structure is operated at the two-chip mode. As shown in this figure, when either one of the DSP 2*a* and the DSP 2*b* issues a command (W/R) at each access timing, the access to the external memory 102 is allowed, and a data is written on or read out from the external memory 102.

Conversely, when both the DSP 2*a* and the DSP 2*b* issue a command (R/W), or none of them issue any command, the access to the external memory 102 is not performed (N after control: no access).

Figure 17:
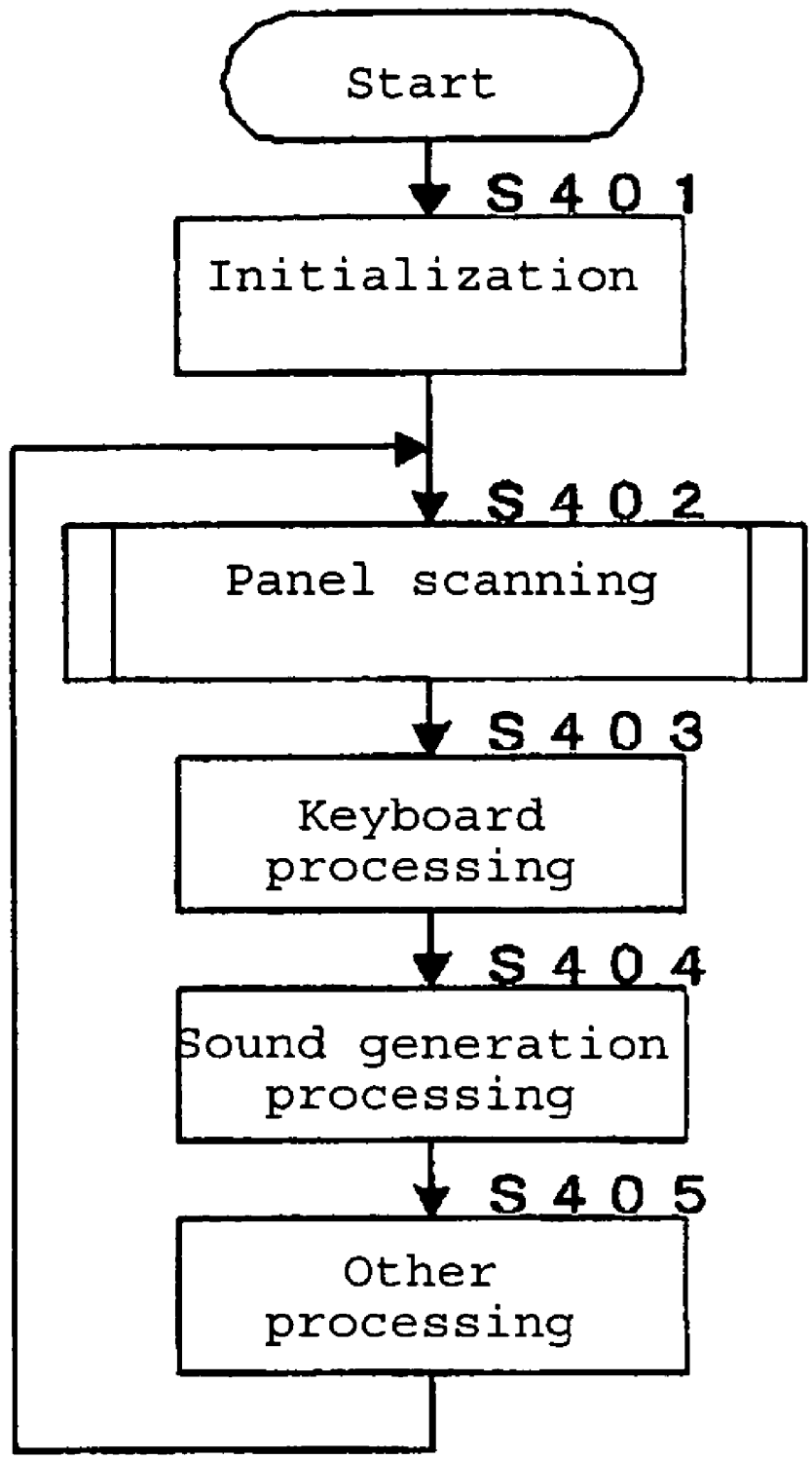
FIG. 17 is a flowchart showing the main processing of the electronic keyboard musical instrument according to Embodiment 2.

FIG. 17 shows a processing flow in the main processing of the electronic keyboard musical instrument according to Embodiment 2, which is basically the same as the flowchart shown in FIG. 7 in connection with Embodiment 1. The main processing routine starts when the power is turned on. Specifically, the power is turned on, the CPU 111, the RAM 113, the respective scan circuits 114*a* and 115*a*, the external memory 102 and the other elements are initialized (Step S401). In the initialization step, the CPU 111 and the hardware in the LSI for effect processing 21 are set to the initial states, and the registers, the counter, the flags and the like defined in the RAM 113 are set to the initial values.

Upon completion of the initialization step, the operation panel 114 is scanned as described later (Step S402).

Then, the keyboard 115 is subjected to keyboard processing (the keyboard is scanned) (Step S403). In the keyboard processing step, key-on data are prepared according to key-on operation in the electronic keyboard musical instrument, and the key-on data are output to the sound source described above.

After that, the sound source 100 and the LSI for effect processing 21 are used, based on the key-on data, to perform sound generation processing (and sound-eliminating processing according to key-off operation) (Step S404).

Next, other operations are performed (Step S405). In processing for the other operations, the other operations than the processing described above, such as ON/OFF processing of pedals, and MIDI processing, are performed.

Then, the operation returns to Step S402, and the steps of from Step S402 to S405 are repeated.

Figure 18:
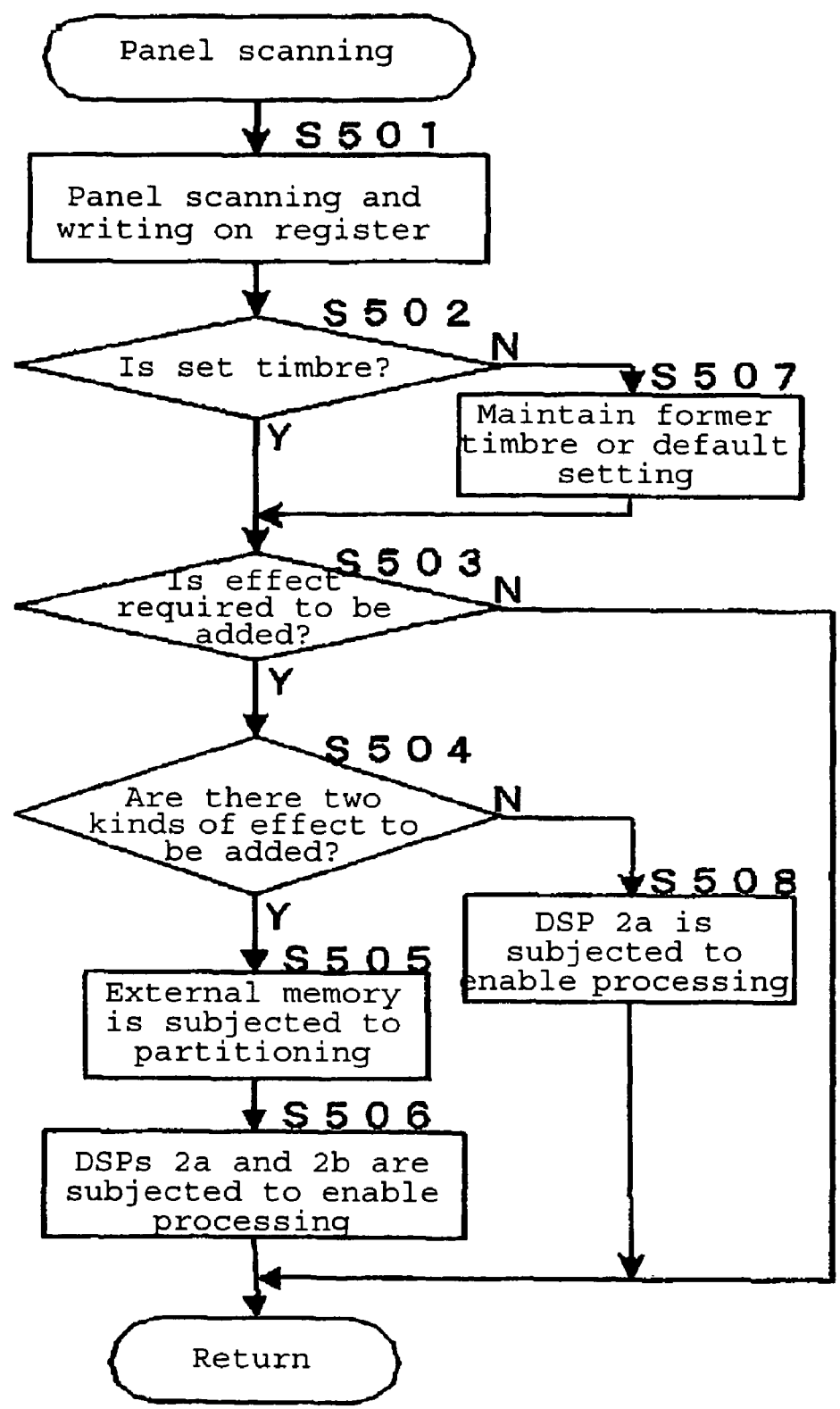
FIG. 18 is a flowchart showing the procedure of the panel scan in Step S402.

FIG. 18 is a flowchart showing the procedure in a panel scan in Step S402 shown in FIG. 17.

When the panel scan circuit 114*a* detects that a panel operation is performed on the operation panel 114, the register for flag processing is written so as to correspond to the panel operation (Step S501).

In this step, e.g., the timbre used in a performance and the application of a desired effect to an output musical sound are set by the operation panel 114 as described above. When such setting is made, the timbre setting flag is set according to timbre selection on the operation panel 114, and the effect to be applied to the output of the timbre is automatically selected, setting the effect setting flags.

In some cases, a musical performer directly operates, e.g., a panel switch on the operation panel 114 to change an effect setting flag, to set the two-chip mode flag, and to set the LSI for effect processing 21 to the two-chip mode as described above.

Next, the CPU 111 refers to the timbre setting flag to check out whether the timbre setting flag is newly set or not (Step S502). When a new timbre is not set, or when the setting of a timbre is not made (N in Step S502), the former timbre setting is maintained, or the timbre specified by default (such as piano timbre) is set (Step S507). Then, the CPU 111 refers to the effect setting flag to check out whether an effect is required to be added (Step S503). Unless such an effect is required to be added (N in Step S503), the panel scan processing ends, and the operation returns to the main routine.

Conversely, when an effect is required to be added (Y in Step S503), whether two effects are required to be added or not is checked out (Step S504). Unless such two effects are required to be added (N in Step S504), the DSP 2a is subjected to enable processing (Step S508), and the operation returns to the main routine.

Conversely, when two effects are required to be added (Y in Step S504), the external memory 102 is partitioned into a section for the DSP 2a and a section for the DSP 2b (Step S505), and the DSP 2a and the DSP 2b are subjected to enable processing (Step S506). After that, the operation returns to the main routine.

In accordance with the structure of Embodiment 2 described above, the system LSI 21 is configured that the plural DSPs for applicating an effect to a musical tone waveform data to be output are formed in a single package and that the DSPs share the single external memory 102. As a result, it is possible to reduce power consumption and improved processing speed, to prevent the capacity of the external memory 102 from being wasted, and to simply design a circuit for performing signal processing by using the plural DSPs.

Figure 19:
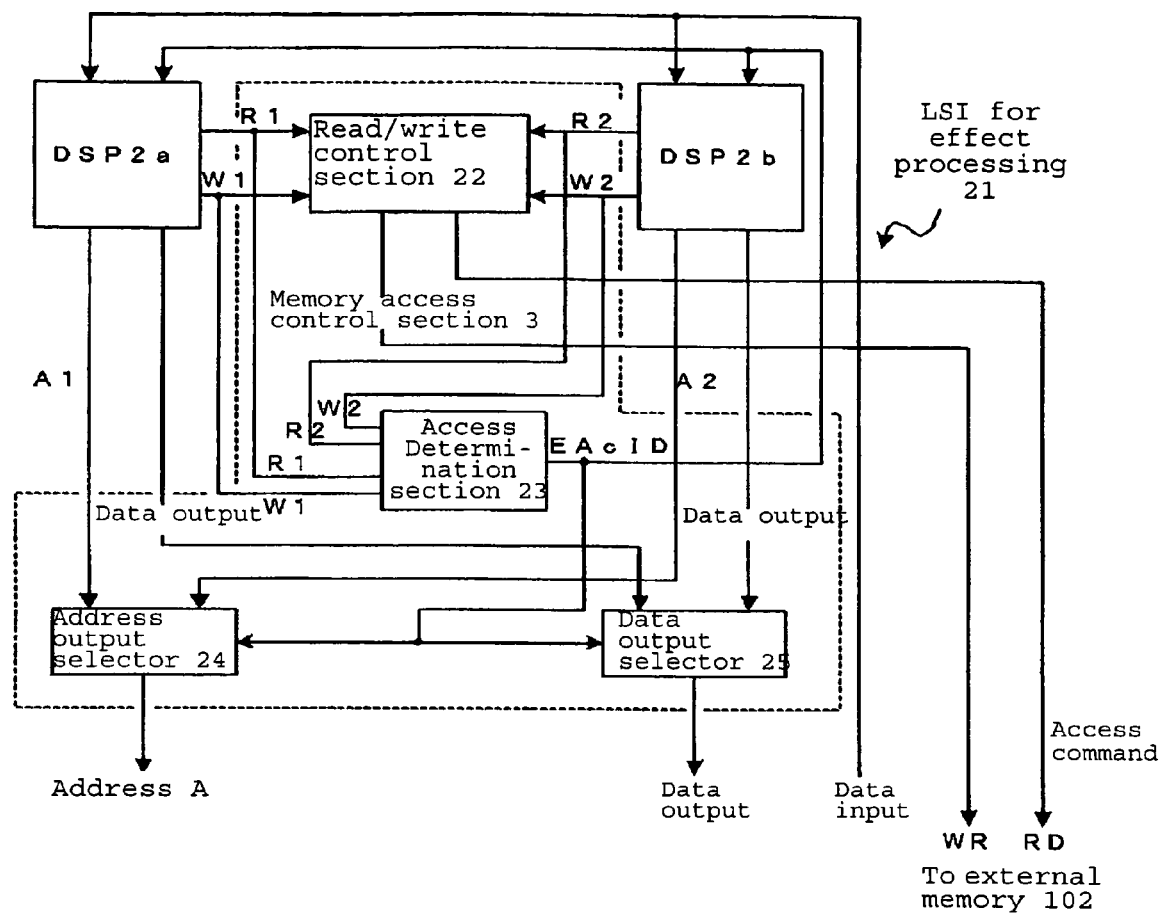
FIG. 19 is a schematic view showing another structure of the access determination section 23 shown in FIG. 12.
Figure 20:
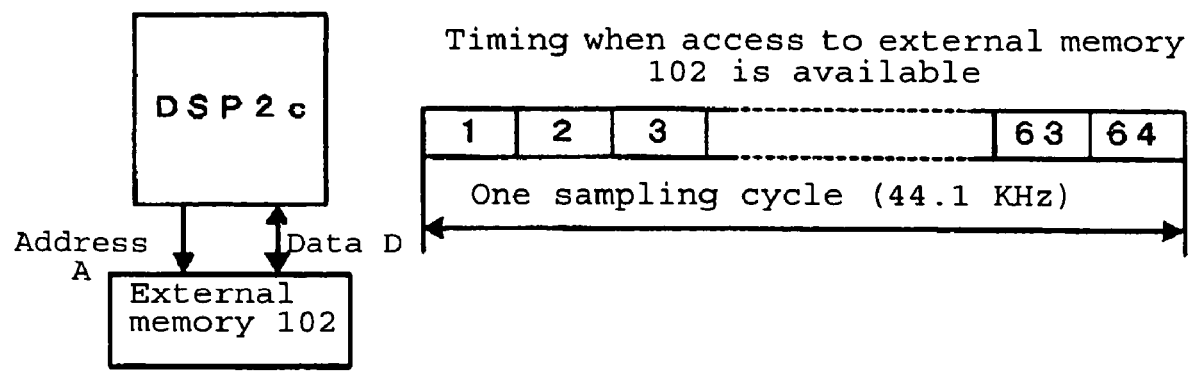
FIG. 20 is a schematic view showing the connection state of a conventional DSP 2c, which is used, being connected to an external memory 102 for storing a digital delay data.

FIG. 19 is a schematic view showing another structure of the access determination section 23 shown in FIG. 12. As shown in this figure, the access determination section is configured so to have the inputs connected to receive all read/write commands (RD1, RD2, W1 and W2) from the DSP 2a and the DSP 2b. When the DSP 2a or the DSP 2b issues a read command (R1/R2) or a write command (W1/W2) at the same timing, the access determination section determines which DSP is allowed to perform memory access.

As shown in this figure, the access determination section is configured to use a logic circuit, wherein the read command R1 and the write command W1 from the DSP 2a, and the read command R2 and the write command W2 from the DSP 2b are input into input ports, and a chip enable signal (EAcID) is output from an output port. In the structure shown in this figure as well, when no command is issued from the DSP 2a, the chip enable signal (EAcID) is output as "1", allowing the DSP 2b to perform memory access.

Conversely, when a command is issued from the DSP 2a, the chip enable signal (EAcID) is outputted as "0", allowing the DSP 2a to perform memory access.

It should be noted that the data processor according to the present invention is not limited to the embodiments described above. It is understood that changes and variations may be made without departing from the spirit of the present invention.

INDUSTRIAL APPLICABILITY

The data processor according to the present invention is applicable not only to an electronic musical instrument but also widely to a structure wherein a CPU accesses a single external memory through a data processor, such as a DSP. The data processor according to the present invention is also applicable to a circuit, which is shared by a plurality of data processors.

The invention claimed is:

1. A data processor, comprising:
a CPU configured to control an entire system;
a DSP configured to perform preset processing, to have at least two bus cycles in a unit of one data access, and to use a selectable number of the bus cycles in the unit of one data access; and
an external memory configured to be accessed by the DSP and to be accessed through the DSP by the CPU, wherein
a data word length accessed by the DSP at the external memory is variable, and
the DSP includes
a determination unit configured to determine whether the DSP is accessing the external memory;
a control unit configured to determine whether the CPU is allowed to access the external memory, based on a signal from the determination unit; and
a switching unit configured to perform a switching operation of an address and a data in connection with the external memory according to a command from the control unit, and to input and to output the address and the data based on the switching operation,
wherein when the DSP accesses the external memory using a maximum number of the bus cycles in a unit of data access wherein the DSP actually accesses the external memory, access from the CPU to the external memory is placed in a wait state until a subsequent unit of data access commences, and
when the DSP does not access the external memory using the maximum number of the bus cycles in said unit of data access wherein the DSP actually accesses the external memory, access from the CPU to the external memory is constantly allowed during said unit of data access.

2. A data processor, comprising:
a CPU configured to control an entire system;
a sound source configured to supply a musical tone signal;
a DSP configured to perform preset processing to apply a desired effect to the musical tone signal supplied from the sound source, to have at least two bus cycles in a unit of one data access with respect to signal processing of the musical tone signal, and to use a selectable number of bus cycles in the unit of one data access; and
an external memory configured to be accessed by the DSP and to be accessed through the DSP by the CPU, wherein
a data word length accessed by the DSP at the external memory is variable, and
the DSP includes
a determination unit configured to determine whether the DSP is accessing the external memory;
a control unit configured to determine whether the CPU is allowed to access the external memory, based on a signal from the determination unit; and a switching unit configured to perform a switching operation of an address and a data in connection with the external memory according to a command from the control unit, and to input and to output the address and the data based on the switching operation, wherein when the DSP accesses the external memory using a maximum number of the bus cycles in a unit of data access wherein the DSP actually accesses the external memory, access from the CPU to the external memory is placed in a wait state until a subsequent unit of data access commences, and when the DSP does not access the external memory using the maximum number of the bus cycles in said unit of data access wherein the DSP actually accesses the external memory, access from the CPU to the external memory is constantly allowed during said unit of data access data.

3. A data processor having a fixed number of memory access timings per sampling cycle, the data processor comprising:

a plurality of DSPs configured to access a single external memory in a single package;

a read/write control unit configured so that when each of the DSPs issues a read command or a write command at a same time, none of the commands from the DSPs are performed and when only one of the DSPs issues the read command or the write command, the command from the only one DSP is performed;

an access determination unit configured so that when each of the DSPs issues the read command or the write command at the same time, none of the DSPs are not allowed to access the external memory and when the only one of the DSPs issues the read command or the write command, the only one DSP is allowed to access the external memory;

a first selector configured to output an address from the allowed DSP in response to a determination signal from the access determination unit; and a second selector configured to output data from the allowed DSP in response to the determination signal, wherein each of the DSPs includes a control unit configured to acquire data from the external memory in response to the determination signal from the access determination unit, and the read/write control unit does not access the external memory when each of the DSPs simultaneously issues a command.

4. A data processor having a fixed number of memory access timings per sampling cycle, the data processor comprising:

a plurality of DSPs configured to access a single external memory in a single package, the external memory storing musical tone waveform data;

a read/write control unit configured so that when each of the DSPs issues a read command or a write command at a same time, none of the commands from the DSPs are performed and when only one of the DSPs issues the read command or the write command, the command from the only one DSPs is performed;

an access determination unit configured so that when each of the DSPs issues the read command or the write command at the same time, none of the DSPs are not allowed to access the external memory and when only one of the DSPs issues the read command or the write command, the only one DSP is allowed to access the external memory;

a first selector configured to output an address from the allowed DSP in response to a determination signal from the access determination unit; and a second selector configured to output data from the allowed DSP in response to the determination signal, wherein each of the DSPs includes a control unit configured to acquire data from the external memory in response to the determination signal from the access determination unit, and the read/write control unit does not access the external memory when each of the DSPs simultaneously issues a command.

\* \* \* \* \*